US009635262B2

(12) United States Patent
Campbell et al.

(10) Patent No.: US 9,635,262 B2
(45) Date of Patent: *Apr. 25, 2017

(54) MOTION ESTIMATION AND DETECTION IN A CAMERA SYSTEM ACCELERATOR ARCHITECTURE

(71) Applicant: GoPro, Inc., San Mateo, CA (US)

(72) Inventors: Scott Patrick Campbell, Belmont, CA (US); Paul Mobbs, San Francisco, CA (US); Balineedu Chowdary Adsumilli, San Mateo, CA (US); Sumit Chawla, San Carlos, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/282,423

(22) Filed: Sep. 30, 2016

(65) Prior Publication Data

US 2017/0019598 A1    Jan. 19, 2017

Related U.S. Application Data

(63) Continuation of application No. 15/049,016, filed on Feb. 20, 2016, now Pat. No. 9,491,356, which is a
(Continued)

(51) Int. Cl.
*H04N 5/232* (2006.01)
*G06T 3/40* (2006.01)
(Continued)

(52) U.S. Cl.
CPC ....... *H04N 5/23267* (2013.01); *G06T 3/4015* (2013.01); *H04N 1/6027* (2013.01);
(Continued)

(58) Field of Classification Search
CPC ............... H04N 5/2329; H04N 1/2137; H04N 5/23232; H04N 5/23229; H04N 5/35572;
(Continued)

(56) References Cited

U.S. PATENT DOCUMENTS 4,912,763 A   3/1990 Galand et al.
5,196,938 A   3/1993 Blessinger
(Continued)

OTHER PUBLICATIONS

International Search Report and Written Opinion for International Application No. PCT/US2014/057535, Dec. 31, 2014, 11 pages.
(Continued)

*Primary Examiner* — Hung Lam
(74) *Attorney, Agent, or Firm* — Fenwick & West LLP

(57) ABSTRACT

An image capture accelerator performs accelerated processing of image data. In one embodiment, the image capture accelerator includes accelerator circuitry including a pre-processing engine and a compression engine. The pre-processing engine is configured to perform accelerated processing on received image data, and the compression engine is configured to compress processed image data received from the pre-processing engine. In one embodiment, the image capture accelerator further includes a demultiplexer configured to receive image data captured by an image sensor array implemented within, for example, an image sensor chip. The demultiplexer may output the received image data to an image signal processor when the image data is captured by the image sensor array in a standard capture mode, and may output the received image data to the accelerator circuitry when the image data is captured by the image sensor array in an accelerated capture mode.

20 Claims, 17 Drawing Sheets

Related U.S. Application Data continuation of application No. 14/488,283, filed on Sep. 17, 2014, now Pat. No. 9,485,422.

(60) Provisional application No. 61/885,412, filed on Oct. 1, 2013.

(51) Int. Cl.

| | | |
|---|---|---|
| *H04N 5/247* | (2006.01) | |
| *H04N 19/102* | (2014.01) | |
| *H04N 19/172* | (2014.01) | |
| *H04N 19/169* | (2014.01) | |
| *H04N 1/60* | (2006.01) | |
| *H04N 19/91* | (2014.01) | |
| *H04N 19/63* | (2014.01) | |

(52) U.S. Cl.
CPC ..... *H04N 5/23222* (2013.01); *H04N 5/23229* (2013.01); *H04N 5/23245* (2013.01); *H04N 5/23254* (2013.01); *H04N 5/23296* (2013.01); *H04N 5/247* (2013.01); *H04N 19/102* (2014.11); *H04N 19/172* (2014.11); *H04N 19/1883* (2014.11); *H04N 19/63* (2014.11); *H04N 19/91* (2014.11)

(58) Field of Classification Search
CPC .... H04N 2101/00; H04N 5/378; H04N 9/045; H04N 5/232; H04N 19/1883; H04N 19/63; H04N 19/102; H04N 19/91; G06T 3/4015
USPC ............... 348/218.1, 222.1, 294, 333.02
See application file for complete search history.

(56) References Cited

U.S. PATENT DOCUMENTS

| | | | |
|---|---|---|---|
| 5,654,703 A | | 8/1997 | Clark, II |
| 5,933,137 A | | 8/1999 | Anderson |
| 5,974,186 A | | 10/1999 | Smith et al. |
| 6,040,864 A | * | 3/2000 | Etoh ............... H04N 19/51 348/699 |
| 6,091,777 A | | 7/2000 | Guetz et al. |
| 6,476,805 B1 | | 11/2002 | Shum et al. |
| 6,885,395 B1 | | 4/2005 | Rabbani et al. |
| 7,418,142 B2 | | 8/2008 | Zandi et al. |
| 7,536,054 B2 | | 5/2009 | Banno et al. |
| 8,787,470 B2 | | 7/2014 | Hassan et al. |
| 8,830,367 B1 | | 9/2014 | Mobbs et al. |
| 8,879,858 B1 | | 11/2014 | Mobbs |
| 8,970,718 B2 | | 3/2015 | Campbell |
| 9,171,577 B1 | | 10/2015 | Newman et al. |
| 9,288,413 B2 | | 3/2016 | Chawla et al. |
| 2001/0019630 A1 | | 9/2001 | Johnson |
| 2001/0024470 A1 | | 9/2001 | Radha et al. |
| 2005/0074177 A1 | | 4/2005 | Ichimura et al. |
| 2005/0128307 A1 | * | 6/2005 | Kobayashi ............ G06T 3/4023 348/208.1 |
| 2005/0146630 A1 | | 7/2005 | Min et al. |
| 2006/0083432 A1 | | 4/2006 | Malvar |
| 2006/0245751 A1 | | 11/2006 | Nagaoka et al. |
| 2007/0298784 A1 | | 12/2007 | Yamashita et al. |
| 2008/0288953 A1 | * | 11/2008 | Ando ..................... H04N 19/63 718/106 |
| 2009/0136081 A1 | | 5/2009 | Mamidwar et al. |
| 2009/0160957 A1 | * | 6/2009 | Deng .................... G06T 7/2026 348/208.99 |
| 2009/0180553 A1 | * | 7/2009 | Araki ................... H04N 19/176 375/240.26 |
| 2010/0061707 A1 | | 3/2010 | Kosakai et al. |
| 2010/0080479 A1 | | 4/2010 | Odagiri et al. |
| 2010/0092151 A1 | | 4/2010 | Miyakoshi |
| 2010/0165077 A1 | * | 7/2010 | Yin ..................... H04N 19/597 348/42 |
| 2010/0195986 A1 | | 8/2010 | Urata |
| 2010/0226569 A1 | | 9/2010 | Mokrushin |
| 2010/0231738 A1 | | 9/2010 | Border et al. |
| 2011/0149110 A1 | | 6/2011 | Sugiyama |
| 2011/0307248 A1 | | 12/2011 | Yamanashi et al. |
| 2014/0028435 A1 | | 1/2014 | Brockway et al. |
| 2014/0108967 A1 | | 4/2014 | Markham et al. |
| 2015/0092076 A1 | | 4/2015 | Campbell et al. |
| 2015/0296054 A1 | | 10/2015 | Ozawa |
| 2016/0007075 A1 | | 1/2016 | Heo |
| 2016/0080825 A1 | | 3/2016 | Iwami et al. |
| 2016/0275919 A1 | | 9/2016 | Lawrence et al. |

OTHER PUBLICATIONS

Office Action for U.S. Appl. No. 14/488,283 mailed Apr. 12, 2016, 17 pages.

* cited by examiner

Bayer Color Array
502

YUV 4:2:2
504

$V_R$ $Y_{GR}$ $U_B$ $Y_{GB}$

MOTION ESTIMATION AND DETECTION IN A CAMERA SYSTEM ACCELERATOR ARCHITECTURE

CROSS REFERENCE TO RELATED APPLICATIONS

This application is a continuation of U.S. application Ser. No. 15/049,016, filed Feb. 20, 2016, now U.S. Pat. No. 9,491,356, which application is a continuation of U.S. application Ser. No. 14/488,283, filed Sep. 17, 2014, now U.S. Pat. No. 9,485,422, which application claims the benefit of and priority to U.S. Provisional Application No. 61/885,412, filed Oct. 1, 2013, all of which are incorporated by reference herein in their entirety. This application is related to U.S. patent application Ser. No. 13/940,215, U.S. patent application Ser. No. 13/940,221, and U.S. patent application Ser. No. 14/189,973, the contents of which are incorporated herein by reference in their entirety.

BACKGROUND

1. Field of Art

The disclosure generally relates to the field of image capture systems, and in particular to accelerating image capture.

2. Description of the Related Art

As image sensor technology improves, image sensors are becoming able to capture images and videos at increasingly higher resolutions and frame rates. However, Image Signal Processing (ISP) ASICs often suffer from bandwidth limitations preventing them from effectively processing image sensor frames at the spatial, temporal, and bit-depth resolutions and frame rates at which they are captured. In digital camera systems, such ISP bottlenecks can hinder camera capability. Furthermore, even if an ISP has the capability to keep up with an associated image sensor, the ISP may use more power than a typical camera battery can provide.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
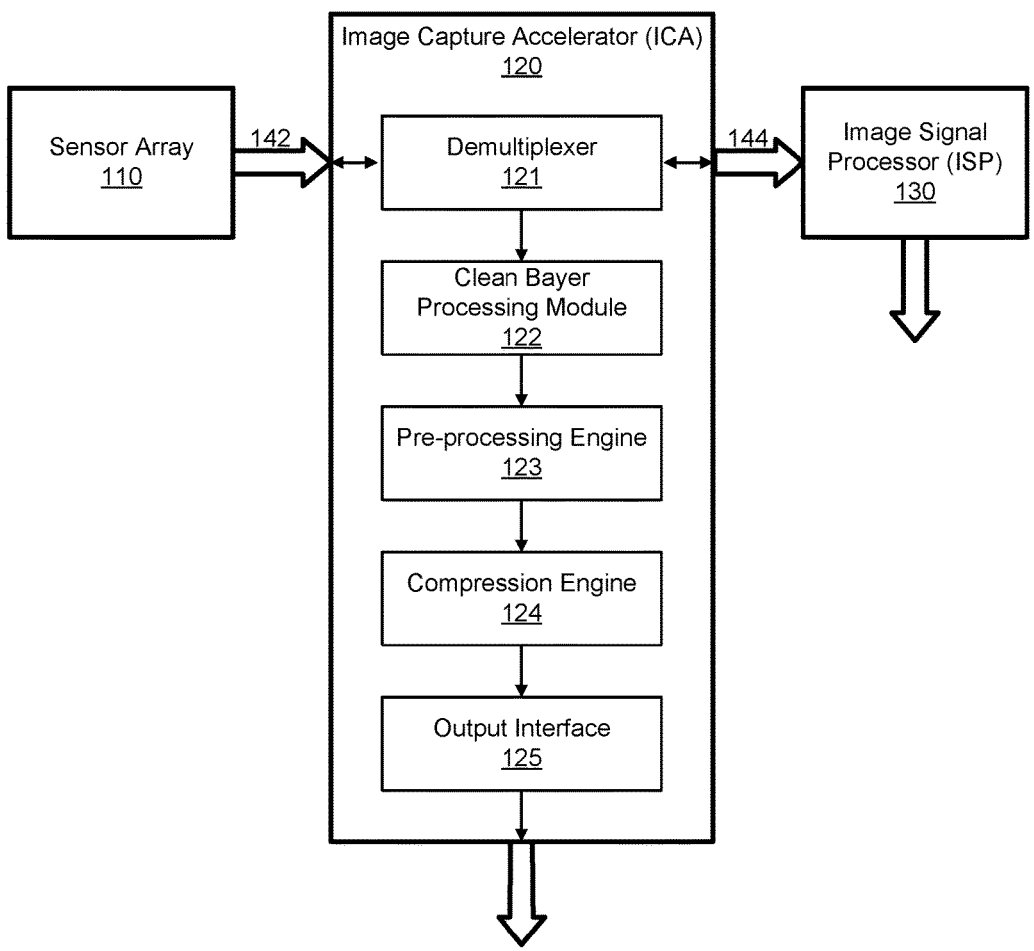
FIG. 1 illustrates one embodiment of a system for image capture acceleration.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

An image capture accelerator provides for the accelerated processing of image data.

In one example embodiment, an image capture system architecture is configured to incorporate an image capture accelerator (ICA). The ICA is configured to address limited ISP bandwidths and/or excessive system power usage while enabling the capture of images at high frame rates. In one example embodiment, the ICA is a device that sidesteps traditional ISP image processing in an image capture system (such as a digital camera) in order to increase the bandwidth and/or decrease the power use of the image capture system. The ICA can be a dedicated ASIC, can be implemented within an image sensor or ISP chip architecture, or can be implemented using existing hardware, firmware, and/or software.

In one embodiment, an image capture accelerator includes accelerator circuitry including a pre-processing engine and a compression engine. The pre-processing engine is configured to perform accelerated processing on received image data, and the compression engine is configured to compress processed image data received from the pre-processing engine. In one embodiment, the image capture accelerator further includes a demultiplexer configured to receive image data captured by an image sensor array, for example on an image sensor chip. The demultiplexer outputs the received image data to an image signal processor (ISP) when the image data is captured by the image sensor array in a first capture mode ("standard mode"), and outputs the received image data to the accelerator circuitry when the image data is captured by the image sensor array in a second capture mode ("accelerated mode"). It should be noted that the ICA may process captured image data in additional modes as understood to those of skill in the art, such as a time lapse mode.

In one embodiment, the standard capture mode is associated with the capture of images at a first frame rate and first resolution, and the accelerated capture mode is associated with the capture of images at a second frame rate and second resolution. In some embodiments, the first frame rate is lower than the second frame rate, and/or the first resolution is lower than the second resolution. Accordingly, when the capture of frames is desired at a higher resolution and/or frame rate than the ISP can accommodate, the ICA can operate in the accelerated mode, and the demultiplexer can output captured image data to the accelerator circuitry.

Image data processed by and output from an ICA may not be in a standard image format, but rather may be in a format requiring further decoding (for instance, to decode coding performed by the ICA) and/or processing (for instance, to format the image data into a standard image format, such as JPEG or PNG). This post-processing can occur within the camera (for instance, subsequent to the capture of the image data) or outside of the digital camera system (for instance, offline in a computer or a mobile device). Further, the image capture system architecture described herein can include additional components configured to receive and process the image data output from the ICA. In one example embodiment, the ICA can capture and process image data in an accelerated mode, can store the processed image data, and can post-process the stored image data into a viewable image format at a later time.

Example Image Capture Acceleration System

Turning now to Figure (FIG. 1, it illustrates a system 100 for image capture acceleration including a sensor array 110, an ICA 120, and an ISP 130. As illustrated in FIG. 1, the ICA 120 is coupled to the sensor array 110 and the ISP 130. A communication bus 142 couples the sensor array 110 to the ICA 120, and a second communication bus 144 couples the ICA 120 to the ISP 130. In this embodiment and others, the communication buses 142, 144 are selected based on the bandwidth requirements of the image capture system 100. For example, the bus 142 may be implemented such that the bus 142 does not inhibit image data transfer or otherwise act as a bottleneck for the image capture system 100.

The sensor array 110 is configured to capture image data and output the image data to a processor, such as the ICA 120 or the ISP 130. In one embodiment, the sensor array 110 is a Bayer color filter array, and the sensor array 110 outputs raw Bayer pattern data. Other types of image sensors may also be used in the accelerated image capture system 100. The sensor array 110 may be configured to capture image data at one or more frame rates and one or more resolutions, for example as specified by a user, under the control of a camera processor (not shown) or the ISP 130. Although not shown in FIG. 1, the sensor array 110 can be implemented within an image sensor chip, for instance a charge-coupled device ("CCD") or complementary metal-oxide semiconductor ("CMOS"), configured to convert captured light incident upon the image sensor chip into electrical signals representing the captured light ("image data" herein).

The ISP 130 processes raw image data received from the sensor array 110 and generates processed image data for output to a display screen, memory, or external computing device. In one embodiment, the ISP 130 performs processing steps including clean Bayer processing, demosaicing, etc., as well as compression to format the raw image data for output. In various embodiments, the ISP 130 may be configured to process the image data to generate image or video files in standard formats, such as JPEG, PNG, TIFF, AVI, or MPEG.

The ICA 120 intercepts image data captured by the sensor array 110 before it is output to the ISP 130. In one embodiment, the ICA 120 is configured to process the image data in response to a user request to accelerate image processing. In another embodiment, the ICA 120 is configured to automatically provide the image data to the ISP 130 when the image sensor captures images in a standard capture mode (for instance, at a low frame rate and/or resolution) and to process the received image data when the image sensor captures images in an accelerated capture mode (for instance, at a higher frame rate and/or resolution). For example, the ICA 120 may send image data to the ISP 130 when the image data is captured at 120 frames per second (fps) and 1080p resolution, while the ICA 120 may process image data (by accelerated processing) when the image data is captured at 240 fps and 4K resolution.

The standard and accelerated capture modes may be defined relative to thresholds. Specifically, the accelerated capture mode can be implemented when capturing image data at an above-threshold frame rate or an above-threshold resolution. In such instances, the thresholds can be low enough to guarantee that image data captured below the threshold frame rate and/or resolution can be processed by the ISP 130. For example, the thresholds may be selected such that a low-end ISP can process the image data captured in the standard capture mode. This allows potential cost savings to be realized by allowing a less expensive ISP to be implemented in the image capture system. Moreover, potential power savings may be realized by using the ICA 120, rather than the ISP 130, for higher-power image processing circumstances.

It should be noted that in one embodiment, when the image sensor captures images in the first mode, the ICA 120 can process the received image data (instead of the ISP 130). For example, in addition to processing image data captured at above-threshold frame rates and resolutions, the ICA 120 may process image data captured at low frame rates and low resolutions (e.g., for previewing images), low frame rates and high resolutions (e.g., for time lapse photography), and high frame rate and low resolution (e.g., for low-bandwidth streaming). Image data may alternatively be processed in parallel by the ICA 120 and ISP 130. Furthermore, when the ICA 120 processes image data, the ISP 130 can remain idle, or can simultaneously process downscaled and/or frame rate-lowered image data (for instance, image data received from the ICA 120), allowing the ISP 130 to keep up with the pace of captured image data while minimizing power consumption. For example, images at 4K resolution captured at 60 fps by the image sensor may be processed by the ICA 120. At the same time, these images can be downscaled (e.g., to a WVGA resolution) at 30 fps (either by the ICA 120 or the ISP 130) and processed by the ISP 130. Such an embodiment allows the image data processed by the ISP 130 to be used for previewing images processed at full resolution and frame rate by the ICA 120, to be stored at the downscaled resolutions and frame rates, to be streamed via WiFi or other low-bandwidth streaming, and the like.

The sensor array 110 may communicate a preferred processing mode (for instance, processing with either the ICA 120 in accelerated capture mode or the ISP 130 in standard capture mode) via the communication bus 142. Alternatively, the ICA 120 may receive information from the camera controller requesting a capture mode, and can determine whether to send the image data to the ISP 130 for processing or to process the image data with the accelerator circuitry of the ICA 120 in response. In one embodiment, a camera controller provides an instruction to operate in standard mode or accelerated mode, and the ICA 120 configures the demultiplexer 121 in response.

In the embodiment illustrated in FIG. 1, the ICA 120 includes a demultiplexer ("demux") 121, a clean Bayer processing module 122, a pre-processing engine 123, a compression engine 124, and one or more output interfaces 125. In other embodiments, the ICA 120 may include fewer, additional, or different components than those described herein, such as one or more CPU cores and memories (which may be configured to function as an ISP in all or certain circumstances), one or more high dynamic range pre-processors, encryption engines, metadata embedding modules, linearization lookup tables, and the like.

The demux 121 is configured to receive image data captured by the sensor array 110 and output the image data to the ISP 130 for processing or output the image data to accelerator circuitry within the ICA 120 for processing. In one embodiment, the demux 121 is an analog demux to reduce power consumption of the ICA 120. In one embodiment the demux 121 outputs the image data to the ISP 130 for processing during image capture at frame rates and/or resolutions that do not require accelerated image processing or large amounts of processing power. The demux 121 can output image data to the accelerator circuitry of the ICA 120 during high frame rate or high resolution image capture modes, or during any other time (for example, during other processing-intensive capture modes, when selected by the user, and the like). In one embodiment, the sensor array 110 controls the control lines of the demux 121, for instance by communicating a control signal based on a desired capture mode. Alternatively, the sensor array 110 can communicate various information useful in making image data processing decisions to the demux 121, such as the frame rate and resolution of image capture, and the demux 121 or ICA 120 can output image data to the ISP 130 or process it at the ICA 120 based on the received information. It should be noted that in some embodiments, the demux 121 may be external to the ICA 120.

The accelerator circuitry of the embodiment of the ICA 120 illustrated in FIG. 1 includes the clean Bayer processing module 122, the pre-processing engine 123, the compression engine 124, and the output interface 125. In one embodiment, the clean Bayer processing module 122 is configured to perform Bayer processing on image data, such as repairing defective pixels, correcting color and luminance, and repairing other capture errors. The pre-processing engine 123 may perform one or more image processing operations on the image data including demosaicing operations, noise reduction operations, image sharpening operations, resolution adjustment, color correction and/or color space conversion, brightness adjustment, pixel formatting operations, quantization, iHDR parsing or other forms of parsing, and the like. In some embodiments, the pre-processing engine 123 performs only minimal processing operations, and does not perform processing operations that require over a threshold amount of time and/or consume over a threshold amount of power. The compression engine 124 is configured to compress the image data by lossy or lossless compression into a compressed data format of equal or smaller size than the original image data. For example, the compression engine 124 may compresses the processed image data using a wavelet compression algorithm, such as VC-5 or CINE-FORM™. An advantage of using a wavelet compression algorithm is the generation of downscaled images, which in one embodiment may be output by the compression engine 124 to the ISP 130 or to a display screen of a camera (e.g., for a user to preview the images).

The one or more output interfaces 125 may output the processed image data to a non-transitory computer-readable storage medium (e.g., flash memory or disk), or can output the processed image data to another component (such as a processor) for storage, subsequent processing, and/or formatting. In one embodiment, the output interface(s) 125 include a physical layer interface coupled to a storage medium, processor, or other component.

In one embodiment, the output image data can be processed via a standard image processing pipeline to format the image data into a standard image or video format (such as the JPEG format, the PNG format, or the MPEG format). This image processing pipeline can be located external to the camera, such as in a computer or other mobile device. By locating the standard image processing pipeline on a device external to the camera, a higher level of image processing quality can be achieved by the external device, provided the external device has greater processing and power resources than the camera and/or is under less restrictive time constraints. Further, by having the external device perform the standard image processing, processing and power load savings can be realized by the camera.

Figure 2:
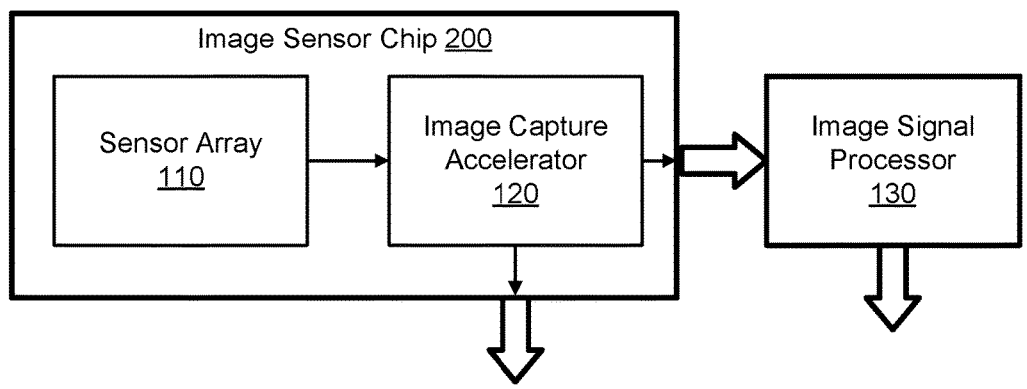
FIG. 2 illustrates an alternative embodiment of the system for image capture acceleration.
Figure 3:
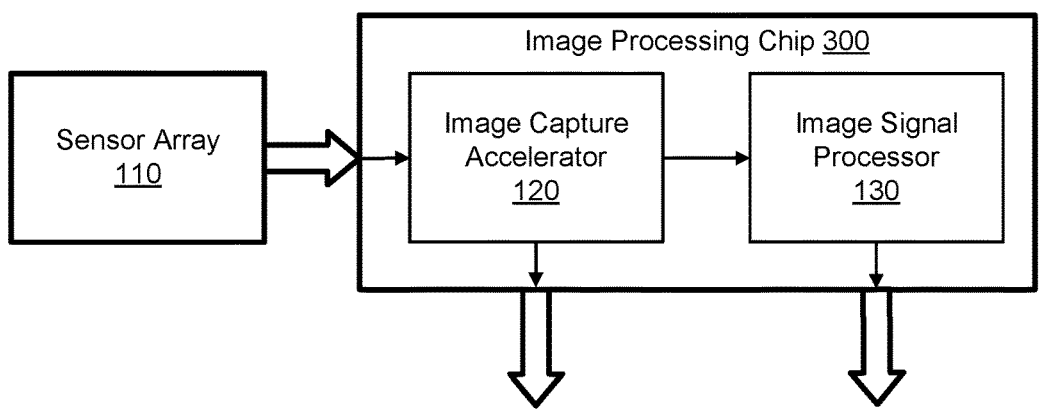
FIG. 3 illustrates an alternative embodiment of the system for image capture acceleration.

As shown in FIG. 1, the ICA 120 is a dedicated IC external to the sensor array 110 and the ISP 130. However, in other embodiments, the ICA 120 and one or more of the sensor array 110 and the ISP 130 may be implemented as a single component. For example, FIG. 2 illustrates an image sensor chip 200 including the sensor array 110 and the ICA 120, which outputs image data to the ISP 130 or another external device, such as a memory internal or external to the camera, or an external processor. Similarly, the ISP 130 may output processed image data to an internal or external memory, another processor, or the like. FIG. 3 illustrates an image processing chip 300 including the ICA 120 and ISP 130. The image processing chip 300 receives raw image data from the sensor array 110 and outputs processed image data to, for example, a memory internal or external to the camera. It should be noted that the components of the ICA 120 described with respect to FIG. 1 can be implemented within the other embodiments described herein; for example, the embodiments of FIGS. 2 and 3 may include one or more of the demux 121, clean Bayer processing module 122, pre-processing engine 123, compression engine 125, and output interface 125 in the processing path.

Figure 4:
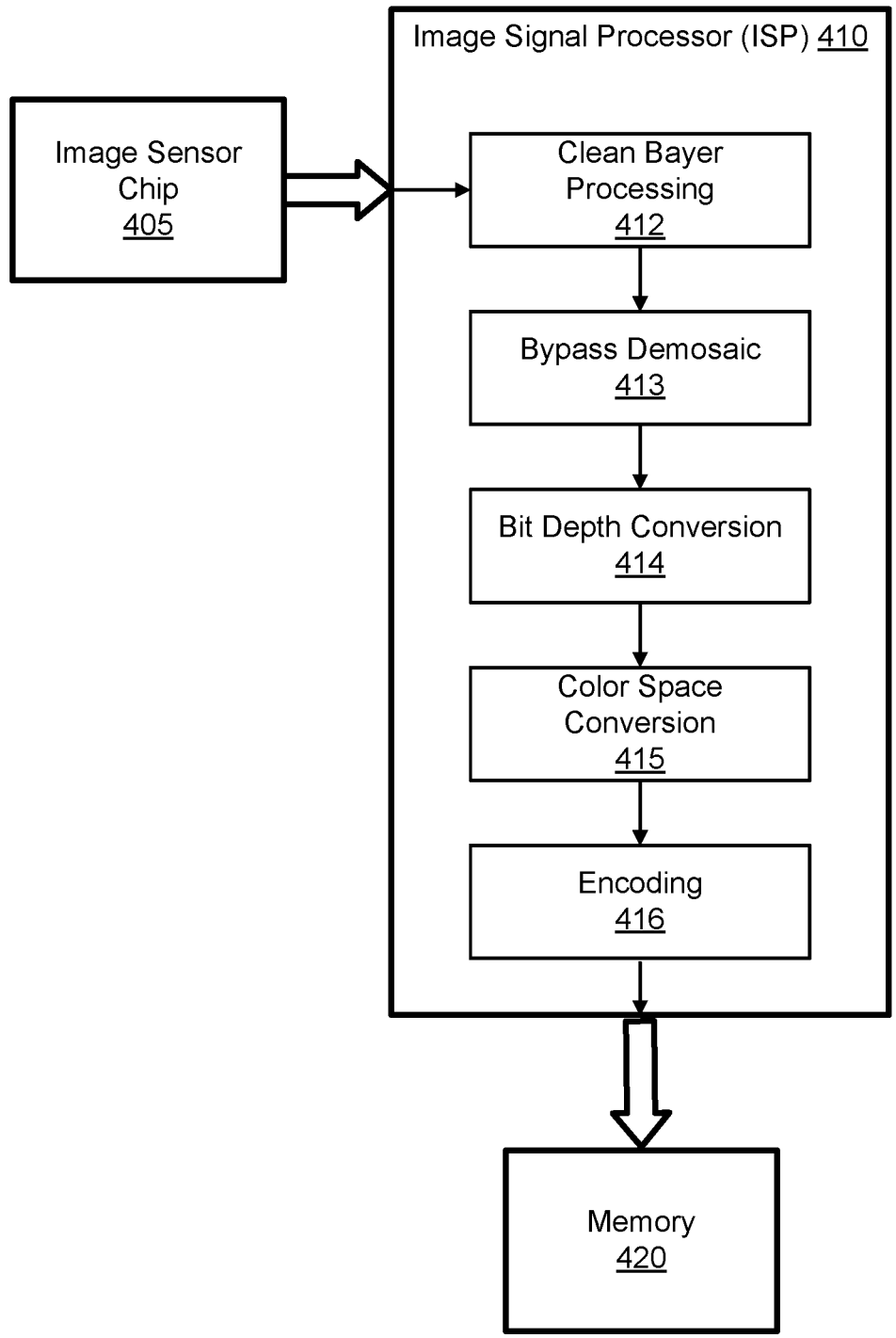
FIG. 4 illustrates one embodiment of an image signal processor (ISP) configured to process image data in an accelerated manner via firmware, without the need for a dedicated image capture accelerator (ICA).

Referring now to FIG. 4, illustrated is an embodiment of an ISP 410 configured to process image data in an accelerated manner via firmware, without the need for a dedicated ICA. The ISP 410 receives captured image data from the image sensor chip 405, processes the received data, and outputs processed image data to the memory 420. In the embodiment of FIG. 4, the ISP 410 can process image data normally in a standard mode (for instance, when the received image data is captured at a frame rate and resolution that do not require accelerated image processing), and can process image data in an accelerated mode (for instance, when accelerated image data processing is required or requested). Alternatively, the ISP 410 can process image data in the accelerated mode regardless of the mode in which the image data was captured.

In one embodiment, the ISP 410 processes image data by implementing one or more of the following steps: 1) performing clean Bayer processing 412, 2) bypassing demosaic processing 413, 3) performing bit depth conversion 414, 4) performing color space conversion 415, and 5) performing image data encoding 416. Each of the operations 412 through 416 can be implemented by dedicated standalone modules, by general processing modules, by hardware, or any other suitable module. The clean Bayer processing operation 412 may include similar functions as those performed by the clean Bayer processing module 122 described with respect to FIG. 1, and in one embodiment may be performed by the clean Bayer processing module 122.

In the standard processing mode, the ISP 410 may perform demosaicing operations on the image data to convert the image data to a standard format. However, in an accelerated processing mode, after clean Bayer processing 412 is performed on the image data received from the image sensor chip 405, standard demosaic processing is bypassed 413 in order to keep the image data in the Bayer color space or native sensor color space. Bypassing 413 the standard demosaic processing may improve the image processing performance of the ISP 410, as the demosaicing step may increase the amount of data processed during subsequent steps. Additional pre-processing operations can also be bypassed, for instance noise reduction and image sharpening operations.

After bypassing 413 various pre-processing operations, the ISP 410 (operating in an accelerated mode) can use look-up tables (LUTs) to perform bit-depth conversion 414. Any suitable LUT can be used to convert 414 the bit-depth of the image data, such as a linear or non-linear domain LUT, a log LUT, a tone/gamma LUT, and the like.

The ISP 410 can then perform color space conversion 415 to convert the image data into the format of the YUV color space. In one embodiment, the image data is converted into the YUV space using a 4:2:2 ratio, which indicates that image data brightness information is stored at twice the resolution of U-component and V-component image data color information, though other YUV ratios can be used as well (such as a 4:1:1 ratio, a 4:4:4 ratio, and the like).

Figure 5:
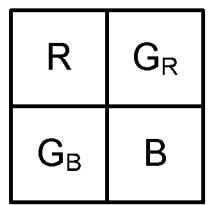
FIG. 5 illustrates an example reordering of a Bayer color array to a YUV 4:2:2 format.
Figure 5:
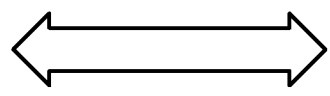

In one embodiment, to perform color space conversion 415, the ISP 410 swizzles the image data (by re-arranging vector entries for the image data) into the YUV color space. Specifically, the ISP 410 may reorder pixel bits of the image data from the Bayer color space into the YUV color space. Swizzling, or reordering, image data into the YUV space can involve mapping the Y component of the YUV domain to the G Bayer component of the image data, mapping the U component of the YUV domain to the B Bayer component of the image data, and mapping the V component of the YUV domain to the R Bayer component of the image data. For example, FIG. 5 illustrates an example conversion of a Bayer color array 502 to a YUV 4:2:2 format 504. The Bayer color array 502 includes a red subpixel R, a blue subpixel B, and two green subpixels $G_R$ and $G_B$. The ISP 410 reorders the pixel bits to form the vector [R $G_R$ B $G_B$] in the YUV 4:2:2 format 504. Alternatively, the ISP 410 may apply a color space transformation to map the Bayer color array to the YUV domain. It should be noted that other forms of swizzling may be performed than those described herein, and the image data may be converted to a color space other than the Bayer color space or the YUV color space.

The ISP 410 encodes 416 the YUV image data using, for example, H.264 or H.265 encoding or any other suitable coding algorithm. The encoded YUV image data may then be output by the ISP 410 for storage by the memory 420. In one embodiment, the memory 420 is a local storage (e.g., an in-camera memory). In another embodiment, the memory 420 is an external memory (e.g., a memory in a computer external to the camera). In the latter embodiment, a compression engine can encode the image data for transmission to the external memory, for example by encoding the YUV image data in the HDMI format and outputting the encoded data in the HDMI output.

The stored encoded YUV image data may be post-processed to undo the YUV-swizzling. After decoding and decompressing the stored encoded YUV image data, the image data can be processed via a standard image processing pipeline to format the image data into a standard image or video format for storage or display. Similar to the embodiment described with respect to FIG. 1, the image processing pipeline for undoing the YUV-swizzling can be located external to the camera, such as in a computer or other mobile device, to achieve a higher level of image processing quality and to reduce processing and power loads of the camera. It should be noted that using the methods of the embodiment of FIG. 4, the effective image processing rate can be twice or more than the standard ISP processing rate, and the amount of power used in image processing may be decreased.

Image Capture Acceleration Via Wavelength Compression

Figure 6:
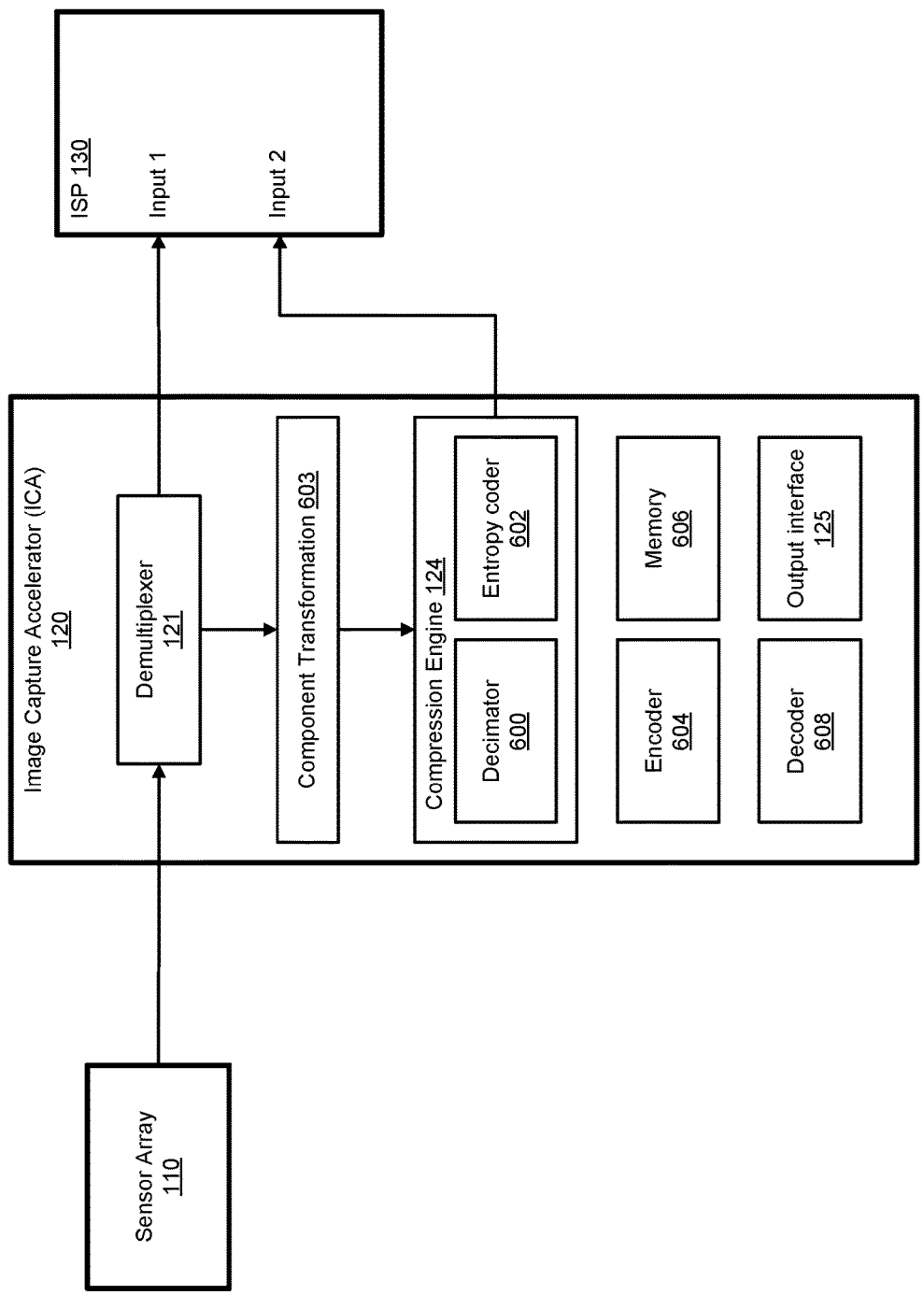
FIG. 6 illustrates one embodiment of a system for image capture acceleration.

FIG. 6 illustrates one embodiment of a system for image capture acceleration. In the embodiment of FIG. 6, the compression engine 124 of the ICA 120 includes a decimator 600 and an entropy coder 602. The ICA 120 further includes a component transformation block 603, an encoder 604, a memory 606, and a decoder 608. As noted above, in alternative embodiments, the ICA 120 can include additional, fewer, or different components.

Figure 7:
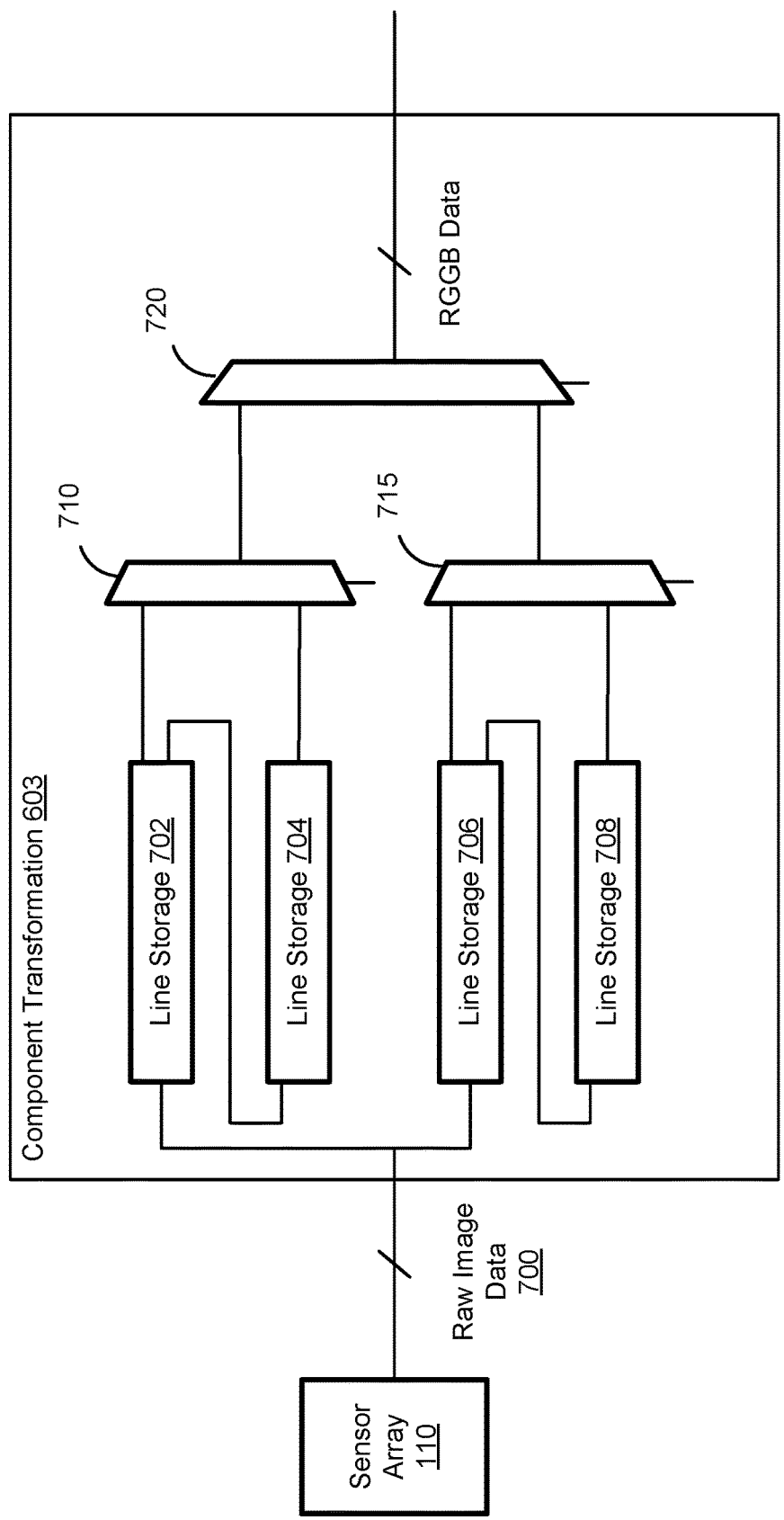
FIG. 7 illustrates an embodiment of a system for simultaneously producing four color components of Bayer-pattern image data.

The component transformation block 603 receives image data from the sensor array 110 and transforms the data into a format suitable for compression. One embodiment of the component transformation block 603 is illustrated in FIG. 7. As shown in FIG. 7, the component transformation block 603 includes four line storage buffers 702, 704, 706, and 708, and output multiplexers 710, 715, and 720. The component transformation block 603 is configured to receive raw Bayer image data 700 and output the four color components of each pixel (e.g., R, $G_R$, $G_B$, and B) simultaneously to the compression engine 124.

The raw image data 700 is arranged in an array of pixels, each of which have four sub-pixels split over two data lines. To provide simultaneous access to the four sub-pixels of each pixel (corresponding respectively to the four color components of the pixel), the component transformation block 603 buffers the two data lines containing the four sub-pixels. In one embodiment, the component transformation block 603 parses the raw image data 700 into lines of image data. In another embodiment, the component transformation block 603 receives lines of raw image data 700 sequentially. As illustrated in FIG. 7, two line storage buffers (e.g., buffers 702 and 704) each receive one or more sub-pixels of a line of the raw image data 700. A second pair of line storage buffers (e.g., buffers 706 and 708) receive two or more pixels of a consecutive line of the raw image data 700. Multiplexers 710 and 715 each combine two adjacent sub-pixels from each line of input data 700, and multiplexer 720 combines the outputs of multiplexers 710 and 715. The output of multiplexer 720 is the four color components of each pixel of raw image data 700.

Returning to FIG. 6, the decimator 600 and the entropy coder 602 collectively perform one or more implementations of wavelet compression, for instance VC-5. The decimator 600 receives image data from the sensor array 110 via the demultiplexer 121 or the component transformation block 603, and decimates the image data to form image sub-band components. In some embodiments, the decimator 600 includes a horizontal high-pass filter, a horizontal low-pass filter, a vertical high-pass filter, and a vertical low-pass filter. The image data can first be processed using the horizontal high-pass and low-pass filters, producing horizontally-filtered sub-band image data components. The horizontally-filtered sub-band components can subsequently be processed using the vertical high-pass and low-pass filters, producing sub-band decimated image data components. In other embodiments, the decimator produces sub-band decimated image data components by filtering the image data in a different order, or by using different filters than those described herein.

The decimator 600 can iteratively decimate image data, producing sub-band decimated image components of increasing granularity. In some embodiments, only certain sub-band decimated image components are iteratively decimated, for instance a sub-band decimated image component that has been processed with both a horizontal low-pass filter and a vertical low-pass filter (a "low/low sub-band component" hereinafter). In such embodiments, the sub-band decimated image data components produced by the decimator 600 are of varying granularity.

The entropy coder 602 performs entropy encoding on the decimated image data produced by the decimator 600 to create encoded image data. In some embodiments, the decimated image data includes wavelet coefficients, coefficients representative of image pixels or of other image properties, or the like. The entropy encoder 602 can quantize these coefficients, can query one or more tone map look-up tables using the coefficients, and can perform entropy encoding on the quantized coefficients to create entropy encoded image data.

One embodiment and implementation of wavelet compression is described in greater detail in U.S. patent application Ser. No. 13/113,950, entitled "Encoding and Decoding Selectively Retrievable Representations of Video Content", filed May 23, 2011, the contents of which are hereby incorporated in their entirety.

Figure 8:
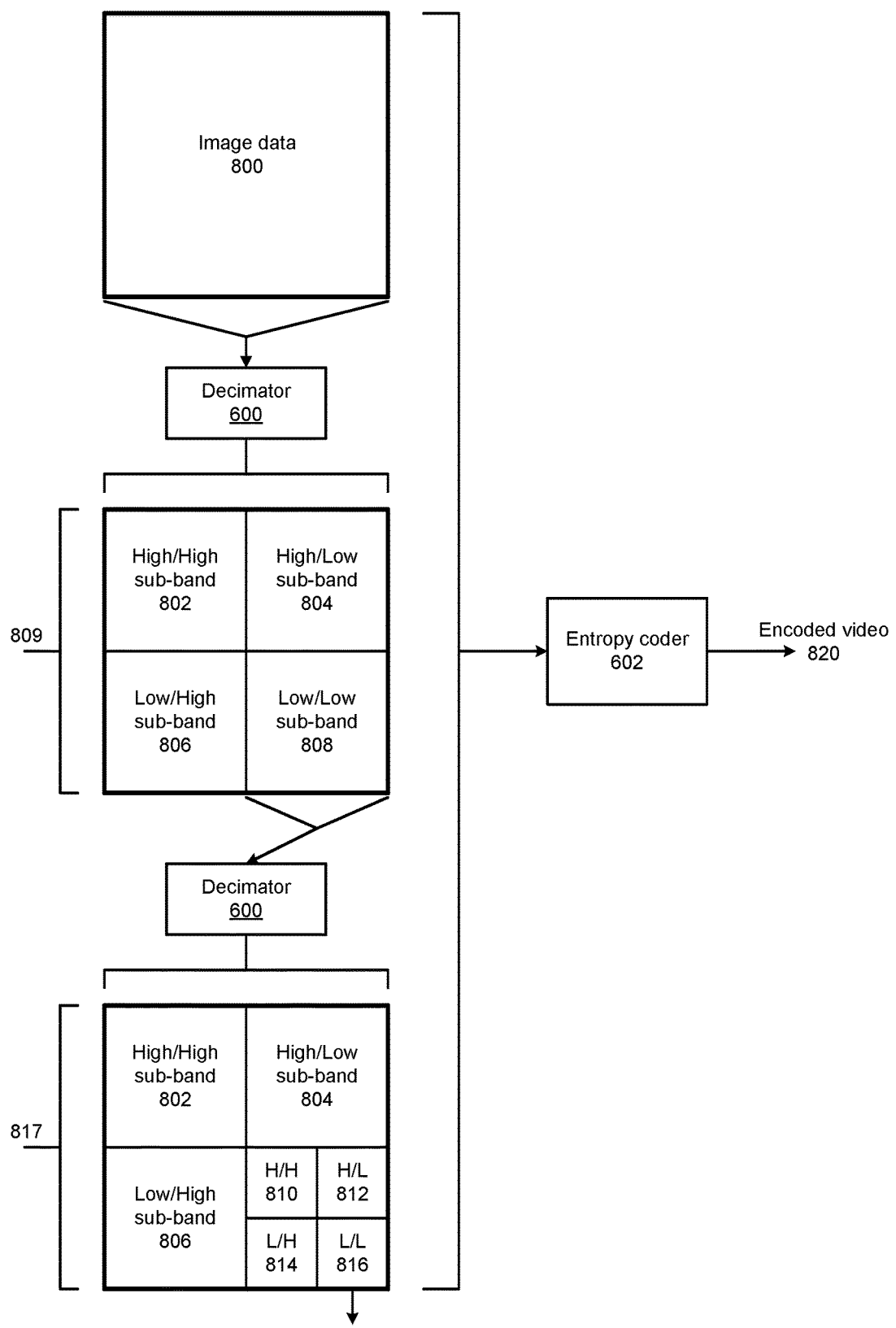
FIG. 8 illustrates an embodiment of image compression via wavelet compression.

FIG. 8 illustrates an embodiment of image compression via wavelet compression. In the embodiment of FIG. 8, image data 800 is accessed by the decimator 600. The decimator 600 decimates the image data 800 to produced decimated image data 809 using a horizontal high-pass filter, a horizontal low-pass filter, a vertical high-pass filter, and a vertical low-pass filter to create sub-band components. In one embodiment, the decimator 600 first processes the image data 800 using the horizontal filters, producing a horizontal high-pass sub-band component and a horizontal low-pass sub-band component. Continuing with this embodiment, the decimator 600 then processes the horizontal high-pass sub-band component using a vertical high-pass filter, producing a high/high sub-band component 802. The decimator 600 also processes the horizontal high-pass sub-band component with a vertical low-pass filter, producing a high/low sub-band component 804. The decimator 600 next processes the horizontal low-pass sub-band component using a vertical high-pass filter, producing a low/high sub-band component 806. Finally, the decimator 600 processes the horizontal low-pass sub-band component using a vertical low-pass filter, producing a low/low sub-band component 808.

It should be noted that in the embodiment of FIG. 8, the heights of the horizontal sub-band components output by the horizontal high-pass filter and the horizontal low-pass filter are equal to the heights of the image data 800, and the widths of the horizontal sub-band components are equal to one-half of the width of the image data 800. In addition, in the embodiment of FIG. 8, the widths and heights of the sub-band components 802, 804, 806, and 808 are equal to one-half the width and height, respectively, of the image data 800. In various embodiments, the low/low sub-band component 808 includes the image represented by the image data 800 at one-quarter the resolution of the image data 800. For instance, if the image data 800 is a 4 k image (3840 pixels by 2160 pixels), the low/low sub-band component 808 can be a 1080p image (1920 pixels by 1080 pixels).

In the embodiment of FIG. 8, the decimator 600 can further decimate the image data in a second decimation iteration to create decimated image data 817 by decimating the low/low sub-band component 808. In such an embodiment, the decimator 600 processes the low/low sub-band component 808 using the horizontal high-pass filter, the horizontal low-pass filter, the vertical high-pass filter, and the vertical low-pass filter described as described above. Decimating the low/low sub-band decimated image data component 808 produces a second high/high sub-band component (H/H 810), a second high-low sub-band component (H/L 812), a second low-high sub-band component (L/H 814), and a second low-low sub-band component (L/L 816). Upon the second decimation iteration, the low/low sub-band component 808 is replaced within the decimated image data 809 with H/H 810, H/L 812, L/H 814, and L/L 816 to form the decimated image data 817. Both the decimated image data 809 and the decimated image data 817 include the high/high sub-band component 802, the high/low sub-band component 804, and the low/high sub-band component 806.

A third decimation iteration can be performed on the L/L sub-band component 816. Additional decimation iterations can also be performed on subsequent L/L sub-band components. The L/L sub-band component 816 includes the image represented by the image data 800 at one-sixteenth the resolution of the image data 800. For instance, if the image data 800 is a 4 k image, the L/L sub-band component 816 can be an image of 960 pixels by 540 pixels.

A set of decimated image data is accessed by the entropy coder 602, and is encoded to form the encoded video 820. In one embodiment, the decimated image data 809 is encoded by the entropy coder 602. Alternatively, the decimated image data 817 can be encoded by the entropy coder 602. In some embodiments, the set of decimated image data encoded by the entropy coder 602 is dependent on the performance or memory requirements of the image capture system, a user-selected or default image capture mode, or based on any other suitable criteria. It should be noted that in some embodiments, upon encoding a set of decimated image data with the entropy coder 602, the decimator 600 does not perform further decimation iterations.

Returning to the embodiment of FIG. 6, the compression engine 124 can be configured to output a decimated image data component to the ISP 130. For instance, the compression engine 124 can output a low/low sub-band decimated image data component, such as component 808 or component 816. As noted above, the low/low sub-band decimated image data components are lower-resolution versions of images represented by image data received from the sensor array 110. Accordingly, by outputting lower resolution image by-products of the wavelet compression performed by the compression engine 124, the ISP 130 has access to lower-resolution image data without requiring additional processing to be performed by the compression engine 124. It should be noted that the compression 124 can output sub-band components to the ISP 130 either before or after performing entropy encoding on the sub-band components.

In the embodiment of FIG. 6, the ISP 130 includes at least two inputs, input 1 and input 2. The ISP 130 is configured to receive full-resolution image data from the sensor array 110 via the demultiplexer 121 at input 1 (for instance, when the ICA 120 is in a standard mode). The ISP 130 is configured to receive image data at a lower-resolution than the full-resolution image data ("lower-resolution image data" hereinafter) from the compression engine 124 at input 2, such as one or more image sub-band components. In some embodiments, the ISP 130 receives a low/low sub-band component from the compression engine 124 and/or additional sub-band components. In some embodiments, the ISP 130 processes image data received at input 1 and input 2 with the same processing components. Alternatively, the ISP 130 can process full resolution image data received at input 1 and lower-resolution image data received at input 2 with separate, dedicated processing components.

The ISP 130 can perform various processing operations on lower-resolution image data received at input 2. In one embodiment, the ISP 130 can encode the lower-resolution image data for display as a preview image, for instance on a camera display or smart device. By encoding lower-resolution image data for display as a preview image, a user can perform a number of operations based on viewing the preview image without requiring the ISP 130 to consume the power and resources required to encode the full resolution image. For instance, in response to viewing a preview image, a user can adjust camera settings for subsequent image capture, can identify one or more image encoding options for use in encoding the full resolution image, or can delete the image prior to encoding the full resolution image.

The ISP 130 can transmit received lower-resolution image data. Various forms of data transmission, for instance wireless transmission, may be associated with or subject to limited transmission bandwidths. Image data resolution is generally proportional to image data quantity/size. Accordingly, by transmitting lower-resolution image data, the ISP 130 can better satisfy transmission bandwidth limitations. In some embodiments, for image data captured in an accelerated mode, a lower-resolution version of the image data is provided to the ISP 130 and wirelessly broadcasted (for instance, to a computing device), while a high-resolution version of the image data is stored until the camera is physically coupled to the computing device.

The ISP 130 can be configured to receive multiple sub-band components, and can prioritize transmission bandwidth based on the importance of a received sub-band component. For instance, the ISP 130 can be configured to prioritize low/low sub-band components such that low/low sub-band components are transmitted first, and other sub-band components are transmitted only if additional transmission bandwidth is available. In such embodiments, the ISP 130 can optimize the quality of transmitted image data by prioritizing sub-band components most representative of the full-resolution image data in limited bandwidth environments. In some embodiments, the ISP 130 receives multiple low/low sub-band components of varying decimation granularity, and selects a low/low sub-band component from the set of low/low sub-band components based on the granularity of the low/low sub-band components and a detected available bandwidth.

In some embodiments, the ISP 130 receives lower-resolution image data at input 2, analyzes the lower-resolution image data, and adjusts various image capture settings based on the analysis. For instance, the ISP 130 may analyze the lower-resolution image data, and may adjust an auto-exposure setting of the camera, changing exposure times and settings for the sensor array 110. The ISP 130 can adjust the white balance levels in full resolution image data processed by the ICA 120, or can adjust auto-white balance levels during image capture based on a white level analysis of the lower-resolution image data. The ISP 130 can adjust the auto-focus settings of a camera lens based on determined focus levels in the lower-resolution image data. The ISP 130 can adjust any suitable camera settings based on an analysis of lower-resolution image data received from the ICA 120.

It should be noted that in some embodiments, the compression engine 124 outputs other decimated image data components (such as a high/high sub-band decimated image data component) to the ISP 130, and can adjust one or more image capture settings (such as auto-focus) based on an analysis of these other decimated image data components. In some embodiments, the ISP 130 receives high/high and low/low sub-band decimated image data components associated with successive image frames, and optimizes autofocus by maximizing the ratio between various properties of the high/high sub-band component and the low/low sub-band component. Similarly, the ISP 130 can estimate the sharpness of captured image data based on the high/high and low/low sub-band components, and can adjust camera settings based on the estimated sharpness.

In embodiments in which the ISP 130 is associated with multiple cameras configured to capture the same or similar fields of view, the ISP 130 can use low/low sub-band decimated image data components to align the fields of view of the multiple cameras. In such embodiments, the ISP 130 can receive a low/low sub-band decimated image data component from each camera, can attempt to align the sub-band components (for instance, using an alignment algorithm), and can adjust the fields of view of the cameras based on the attempted alignment of the sub-band components.

The ISP 130 can be configured to process and output or store full resolution image data, for instance 4 k resolution image data, when receiving raw image data from the sensor array 110 via the demultiplexer at input 1 (for instance, when images are captured in a standard mode). Similarly, the ISP 130 can be configured to process and output or store lower resolution image data, for instance 1080p resolution image data, when receiving decimated image data from the compression engine 124 at input 2 (for instance, when images are captured in an accelerated mode).

The embodiment of FIG. 6 includes an encoder 604 configured to encode image data, such as image data received from the sensor array 110, or decimated image data received from the compression engine 124. The encoder 604 is an encoder configured to encode image data using one or more encoding algorithms or methods. As described herein, the encoder 604 encodes image data using the H.264 encoding algorithm, though it should be known that in other embodiments, the encoder 604 can implement any other suitable image or video encoding algorithms.

The memory 606 is configured to store image data, either on a permanent or temporary basis. For instance, the compression engine 124 can store image data in the memory 606 between decimation iterations, or after decimation and/or encoding by the entropy coder 602. In some embodiments, encoded image data is stored at the memory 606 prior to being outputted to an external storage module via the output interface 125. In some embodiments, image data stored external to the ICA 120 is retrieved via the output interface 125 and stored in the memory 606 for subsequent encoding and/or decoding by the ICA 120.

The memory 606 can be used for both encoding operations (for instance, by the compression engine 124 or the encoder 604) and decoding operations (for instance, by the decoder 608, as described below). Typical systems require separate memories for encoding and decoding operations. However, by utilizing multiplexers and demultiplexers, a single memory 606 can be used for both encoding and decoding (though not simultaneously). For instance, in an encoding mode, multiplexers can couple memory read/write and control lines to the compression engine 124 or the encoder 604, and in a decoding mode, the multiplexers can couple memory read/write and control lines to the decoder 608. By utilizing a single memory for both encoding and decoding, memory costs can be reduced, the ICA footprint can be reduced, power consumption and input/output lines can be reduced, and the like. In such embodiments, the compression engine 124, the encoder 604, and/or the decoder 608 can store image data in the memory 606 before, during, or after encoding and decoding operations.

The decoder 608 is configured to decode encoded image data. In some embodiments, the ICA 120 encodes raw image data and stores the image data at a storage module external to the ICA 120. In such embodiments, the ICA 120 can subsequently retrieve the encoded data, can decode the encoded data using the decoder 608 to create the original raw image data, and can output the raw image data to the ISP 130. For example, the ICA 120 may process and encode data in an accelerated capture mode when the camera is in use, and may decode the encoded data and output the original raw data to the ISP 130 when the camera is no longer in use. Such embodiments may beneficially allow a camera to capture image data at normally prohibitive frame rates and resolutions by storing captured image data without fully processing the captured image data into a viewable format, and allow the camera to subsequently fully process the captured image data into a viewable format when the camera is no longer in use and subject to image capture rate bottlenecks.

In some embodiments, the H.264 encoding performed by the encoder 604 is more time-efficient than the wavelet compression performed by the compression engine 124, but results in a greater quantity of compressed image data than the wavelet compression. Likewise, in some embodiments, the wavelet compression performed by the compression engine 124 results in a smaller quantity of compressed image data than the H.264 encoding, but is less efficient. Accordingly, some use cases may require the efficiency of H.264 and the encoded data quantity size of wavelet compression.

Figure 9:
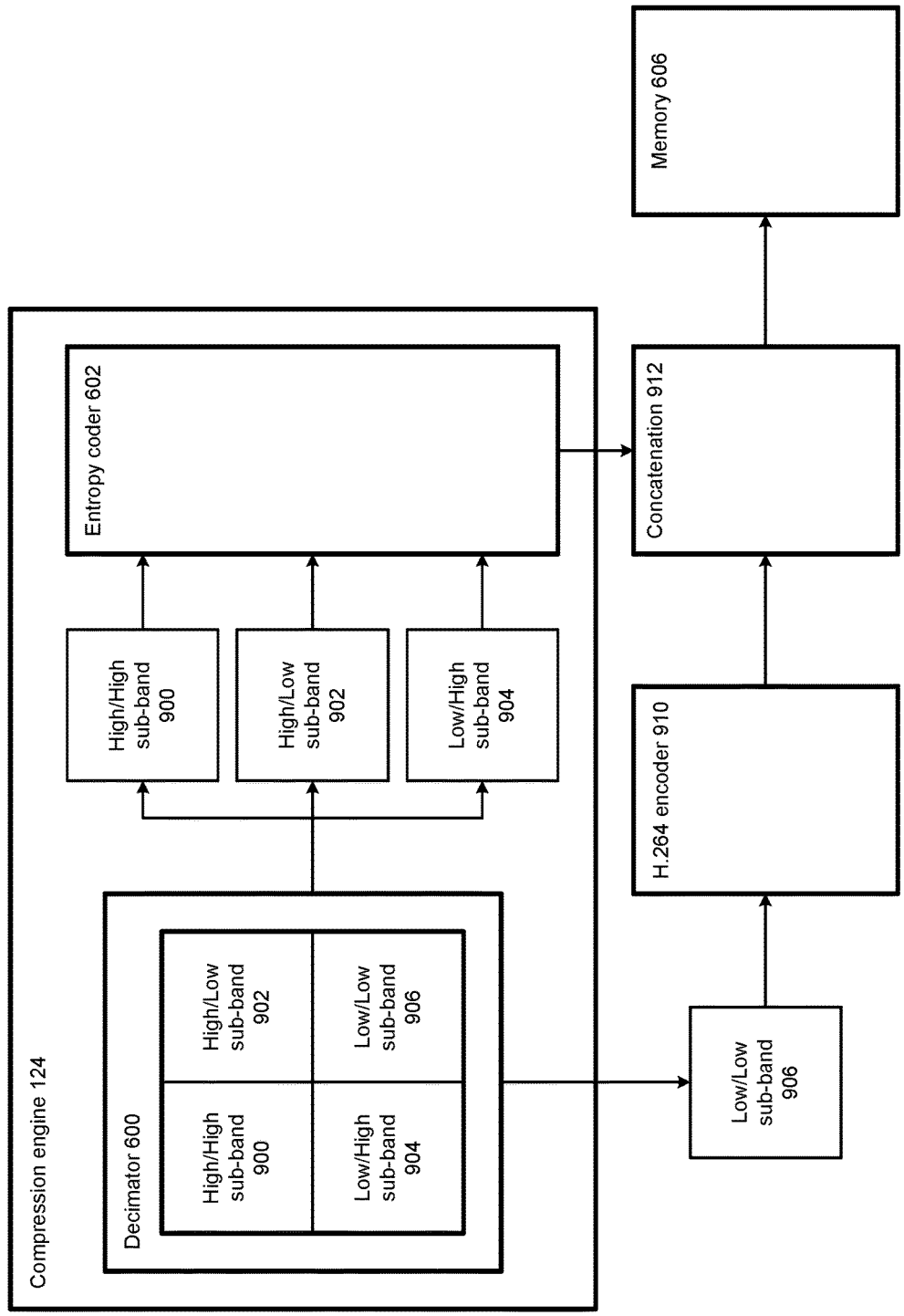
FIG. 9 illustrates an embodiment of image compression by combining multiple image compression techniques.

FIG. 9 illustrates an embodiment of image compression by combining multiple image compression techniques. The compression engine 124 of FIG. 9 includes a decimator 600 that decimates image data into a high/high sub-band component 900, a high/low sub-band component 902, a low/high sub-band component 904, and a low/low sub-band component 906. The decimator 600 outputs the high/high sub-band component 900, the high/low sub-band component 902, and the low-high sub-band component 904 to the entropy coder 602. The entropy coder 602 performs entropy encoding on these sub-band components, and outputs the entropy encoded components to a concatenation module 912. It should be noted that although not illustrated in FIG. 6, the ICA 120 can include a concatenation module 912, or the functionality of the concatenation module 912 can be implemented within any other component of the ICA 120.

In the embodiment of FIG. 9, the decimator 600 also outputs the low/low sub-band component 906 to a H.264 encoder 910. In some embodiments, the H.264 encoder 910 is implemented within the encoder 604 of FIG. 6. The H.264 encoder 910 encodes the low/low sub-band component 906, and outputs the H.264-encoded component to the concatenation module 912. The concatenation module 912 combines the entropy encoded components and the H.264-encoded component to create combined encoded image data, and outputs the combined encoded image data for storage, for instance in the memory 606. Of the four sub-band components, the low/low sub-band component 906 can include the greatest quantity of image data, making the low/low sub-band component ideally suited for the efficiency of H.264 encoding. Likewise, the high/high sub-band component 900, the high/low sub-band component 902, and the low/high sub-band component 904 can include comparatively less image data, making these components ideally suited for the resulting encoded image data quantity benefits of wavelet compression.

Figure 10:
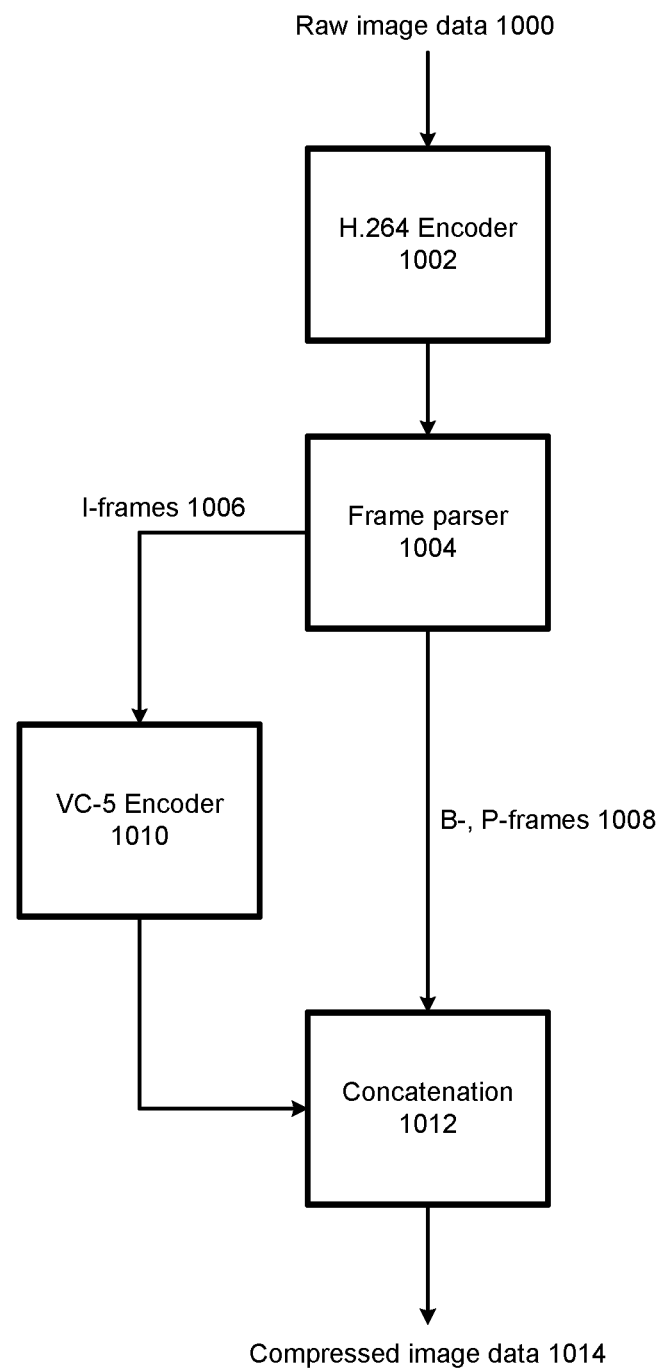
FIG. 10 illustrates an alternative embodiment of image compression by combining multiple image compression techniques.

In some embodiments, image data received at the ICA 120 is processed first by the encoder 604, and then is subsequently processed in all or in part by the compression engine 124. FIG. 10 illustrates an alternative embodiment of image compression by combining multiple image compression techniques. In the embodiment of FIG. 10, raw image data 1000 is accessed by an H.264 encoder 1002. The H.264 encoder 1002 encodes the raw image data into encoded image data including I-frames, B-frames, and P-frames, as is known in the art. The encoded image data is received at a frame parser 1004. The frame parses 1004 outputs the I-frames 1006 to a VC-5 encoder 1010, and outputs the B-frames and P-frames 1008 to a concatenation module 1012. In some embodiments, the VC-5 encoder 1010 is implemented within the compression engine 124. In other embodiments, instead of VC-5 encoding, other forms of encoding not further discussed herein are implemented.

The VC-5 encoder 1010 encodes the I-frames, and outputs encoded I-frames to the concatenation module 1012. As noted above, wavelet encoding, while often less efficient than H.264 encoding, produces smaller quantities of encoded image data. Accordingly, by encoding I-frames with the VC-5 encoder 1010, the encoded image data may be considerably smaller in quantity than the H.264 encoded data. The concatenation module 1012 combines the encoded I-frames and the B- and P-frames 1008 to form compressed image data 1014. The compressed image data 1014 can subsequently be stored in the memory 606.

The encoded image data described herein may not be encoded into a viewable/displayable format. For instance, image data that has been partially encoded using H.264 encoding and partially encoded using wavelet compression must be decoded and encoded into a viewable format prior to display. In such embodiments, the decoder 608 can be configured to decode the encoded image data based on the types of encoding used to encode the image data. For example, if a first portion of raw image data is encoded using wavelet compression, a second portion is encoded using H.264 encoding, and the two portions are concatenated, the decoder 608 can be configured to separate the portions of encoded data, to decode the first portion using wavelet decompression, to decode the second portion using H.264 decoding, and to combine the decoded first and second portions to form the original raw image data.

Figure 11:
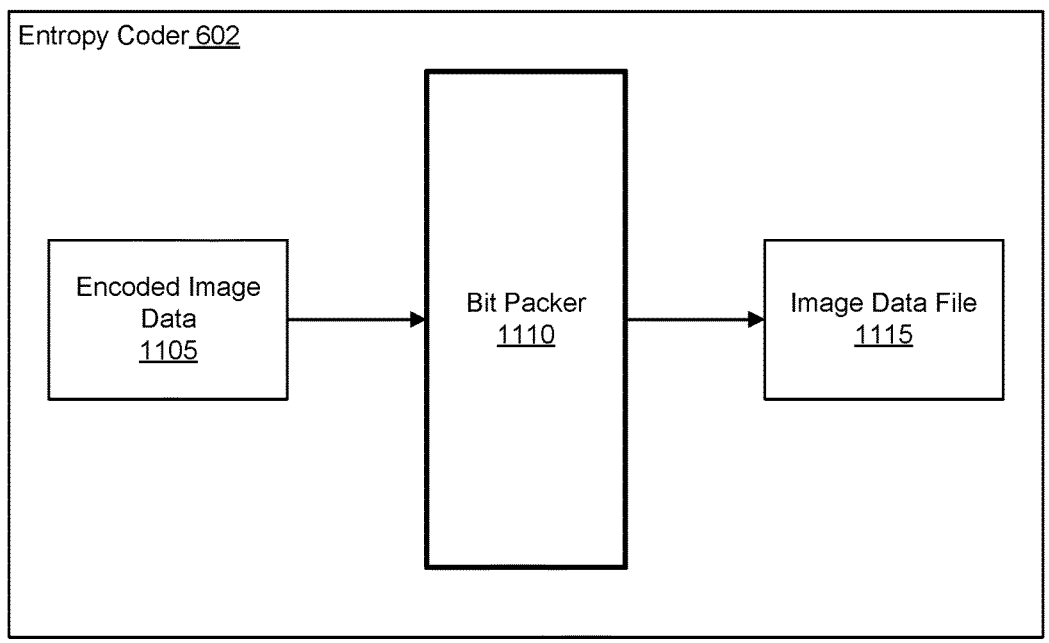
FIG. 11 illustrates an embodiment of generating an output image data file for storage.

FIG. 11 illustrates an embodiment of the entropy coder 602 configured to output compressed, packed image data. In the embodiment illustrated in FIG. 11, the entropy coder includes a bit packer 1110 for receiving encoded image data 1105 and generating an image data file 1115 for storage by the memory 606 or an external memory. In various embodiments of the image capture accelerator 120, the encoded image data 1105 input to the bit packer 1110 may include data encoded by wavelet compression, H.264, or various other compression techniques.

Figure 12:
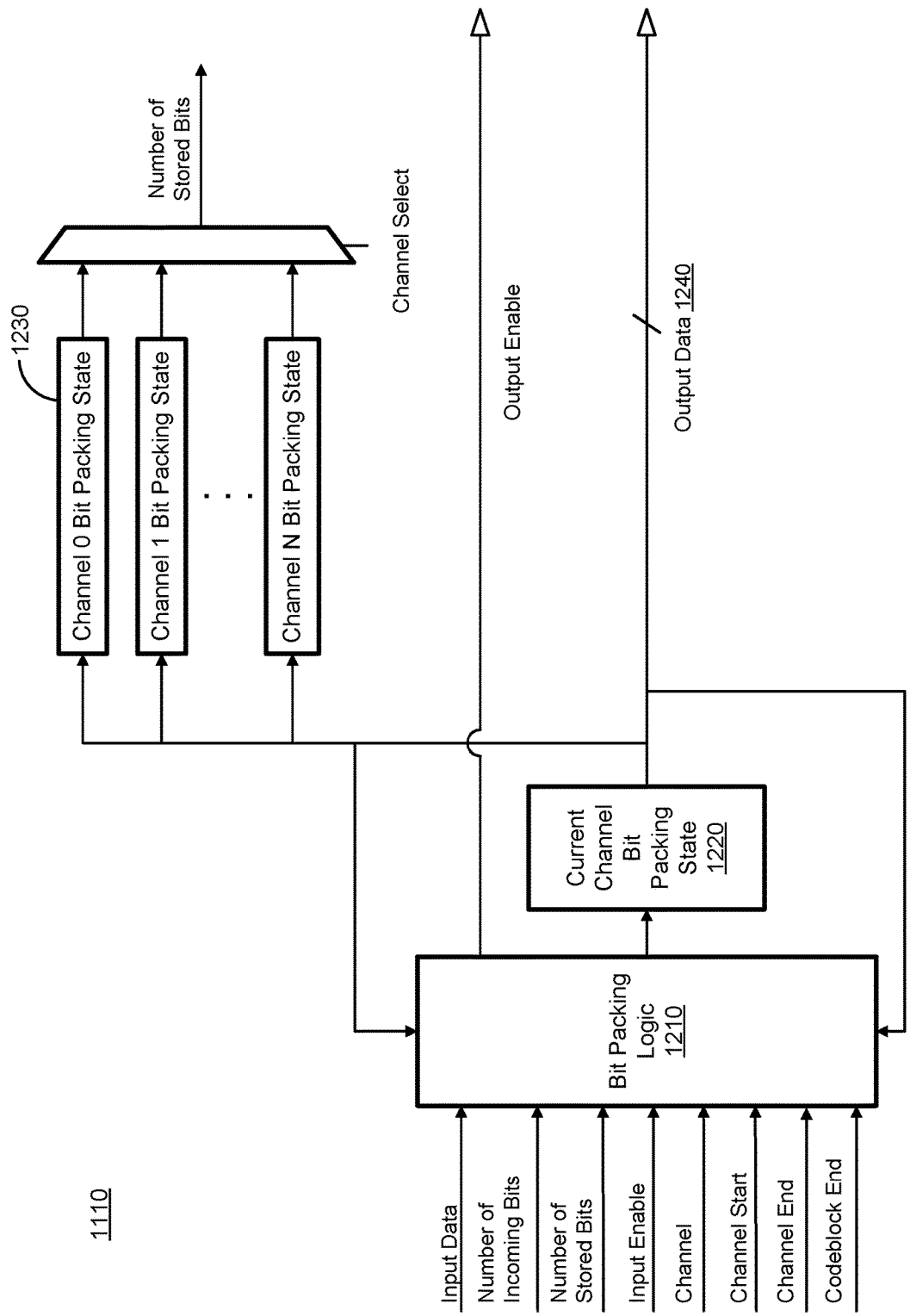
FIG. 12 illustrates an embodiment of a system for generating an output image data file.

A block diagram illustrating an embodiment of the bit packer 1110 is shown in FIG. 12. In one embodiment, the bit packer 1110 is configured to process sub-bands of encoded image data in parallel. The bit packer 1110 includes bit packing logic block 1210, current channel bit packing state register 1220, and a plurality of bit packing state registers 1230. In one embodiment, the bit packer 1110 includes one bit packing state register 1230 for each color channel input to the bit packer 1110. Each bit packing state register 1220, 1230 includes a count (indicating the number of bits stored by the state register) and a shift register.

The bit packing logic block 1210 receives the input data, number of bits, an input enable flag, a channel identifier, a channel start flag, a channel end flag, and a codeblock end flag. When Input Enable is asserted, the bit packing logic block 1210 determines a number of bits of input data to concatenate based on the Number of Incoming Bits signal, and concatenates the corresponding number of bits of the input data with shift-register bits of the current channel bit packing state register 1220. The bit packing logic block 1210 increments the count of bits stored by the current channel bit packing state register 1220 by the Number of Incoming Bits. When the number of bits of data stored by the current channel bit packing state register 1220 reaches the width of output data bus 1240, the bit packing logic block 1210 asserts Output Enable, which indicates that a newly-packed word is available for output (e.g., to the memory 606). After outputting the newly-packed word via the output data bus 1240, the bit packing logic block 1210 decreases the count of the current channel bit packing state register 1220 and shifts the shift register bits of the current channel bit packing state register 1220 to a zero-offset state.

The Channel Start flag indicates a start of active data at an input channel. When the Channel Start flag is asserted, the bit packing logic block 1210 samples and stores the Channel identifier signal and reads the contents of the bit packing state register 1230 associated with the channel identified by the Channel identifier signal into the current channel bit packing state register 1220. The bit packing logic block 1210 determines a number of bits to concatenate based on the Number of Stored Bits signal (indicating the number of bits stored in the bit packing state register 1230) and the Number of Incoming Bits signal, and concatenates the incoming bits with the bits in the current channel bit packing state register 1220. If the number of bits stored by the current channel bit packing state register 1220 reaches the width of the output data bus 1240, the bit packing logic block 1210 asserts Output Enable. When Channel End is asserted, if the number of bits stored by the current channel bit packing state register 1220 is less than the width of the output data bus 1240, the contents of the current channel bit packing state register 1220 are copied to the bit packing state register 1230 corresponding to the channel identified by the stored Channel identifier. Accordingly, the bit packing state registers 1230 store bits from respective input channels until they are concatenated with incoming bits and output via the output data bus 1240. Finally, when the Codeblock End flag is asserted, the bit packing logic block 1210 clears any remaining bits from the current channel bit packing register 1220 and clears the contents of the bit packing register 1230 corresponding to the stored Channel identifier.

In one embodiment, rather than receiving both a Channel Start flag and a Channel End flag, the bit packing logic block 1210 receives a single Channel Active signal. At the rising edge of the Channel Active signal, the bit packing logic block 1210 samples and stores the Channel identifier signal. At the falling edge of the Channel Active signal, the bit packing logic block 1210 copies the contents of the current channel bit packing state register 1220 to the bit packing state register 1230 corresponding to the stored Channel identifier. In one embodiment, the bit packing logic block 1210 generates the Codeblock end flag at the falling edge of the Channel Active signal.

Figure 13A:
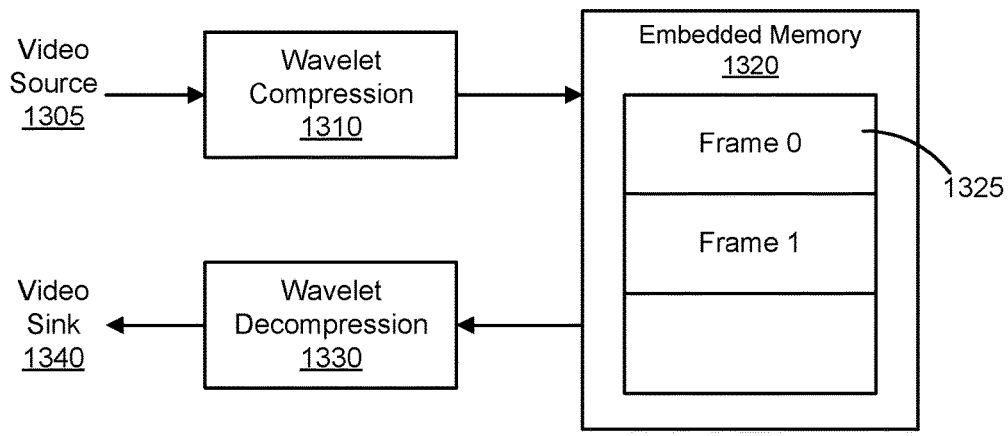
FIGS. 13A-B illustrate embodiments of a direct memory access engine.
Figure 13B:
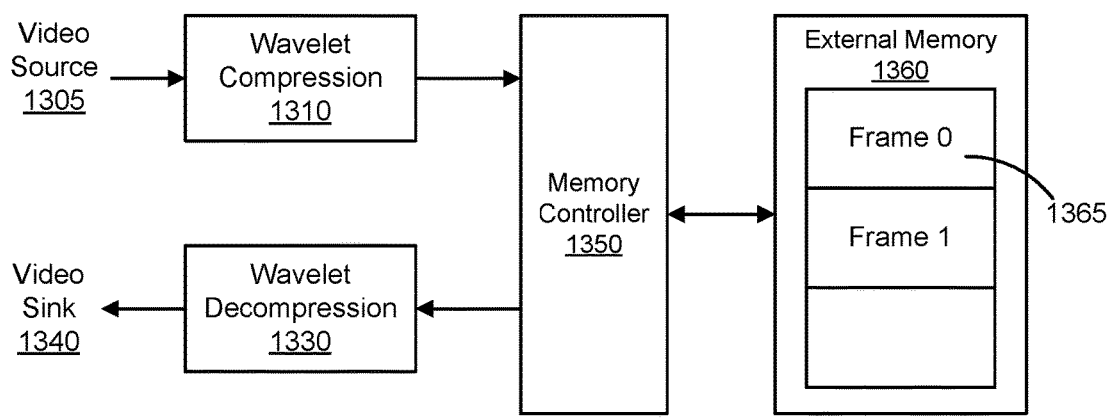

In one embodiment, compressed wavelet sub-bands are written to a frame buffer, where they are stored for further processing or transmission. FIGS. 13A-B illustrate a direct memory access (DMA) engine 1300 for storing wavelet sub-bands in a frame buffer. In one embodiment, as illustrated in FIG. 13A, the DMA engine 1300 includes a wavelet compression engine 1310, an embedded memory 1320, and a wavelet decompression engine 1330. The wavelet compression engine 1310 receives wavelet sub-bands from the video source 1305 (e.g., the demultiplexer 121) and compresses the sub-bands. For example, the wavelet compression engine 1310 may include the compression engine 124 as described herein with respect to various embodiments. As each compressed sub-band is generated, the wavelet compression engine 1310 inserts a header before each packet of data indicating the sub-band number and channel number of the sub-band, as well as length of the compressed data packet.

In the embodiment of the DMA engine 1300 illustrated in FIG. 13A, the wavelet compression engine 1310 writes the compressed sub-bands to the embedded memory 1320, which stores a frame buffer 1325. In the embodiment illustrated in FIG. 13B, the wavelet compression engine 1310 sends the compressed sub-bands to a memory controller 1350 for writing to an external memory 1360, which stores a frame buffer 1365. The compressed sub-bands of each video frame are written to the frame buffer 1325 or 1365 without gaps, and the memory 1320 or 1360 maintains a table identifying the start address of each frame of video data.

In one embodiment, to improve efficiency of subsequent decoding of the compressed sub-bands, the wavelet compression engine 1310 writes compressed sub-bands to the memory 1320 or 1360 in order from lowest to highest order sub-bands for each row of video data. For example, if the wavelet compression engine 1310 compresses the input video data by VC-5 compression and generates low-low, low-high, high-low, and high-high sub-bands, the wavelet compression engine 1310 may write the low-low sub-band to the frame buffer 1325 or 1365, followed by the low-high sub-band, the high-low sub-band, and the high-high sub-band.

The wavelet decompression engine 1330 decompresses the sub-bands stored in the frame buffer 1325 or 1365 and passes the decompressed sub-bands to the video sink 1340. For example, the wavelet decompression engine 1330 may include the decoder 608 as described with respect to various embodiments, and output decompressed image data to the ISP 130 for processing. In one embodiment, the wavelet decompression engine 1330 decompresses sub-bands at a slower rate than the rate at which the image data was captured. For example, if the image sensor 110 captures video data at 120 frames per second the video frames are written to the frame buffer 1325 or 1365 at a rate of 120 frames per second. If the ISP 130 is configured to process video frames at a maximum of 30 frames per second, the wavelet decompression engine 1330 decompresses one out of every fourth frame and sends the decompressed frames to the ISP 130.

Figure 14:
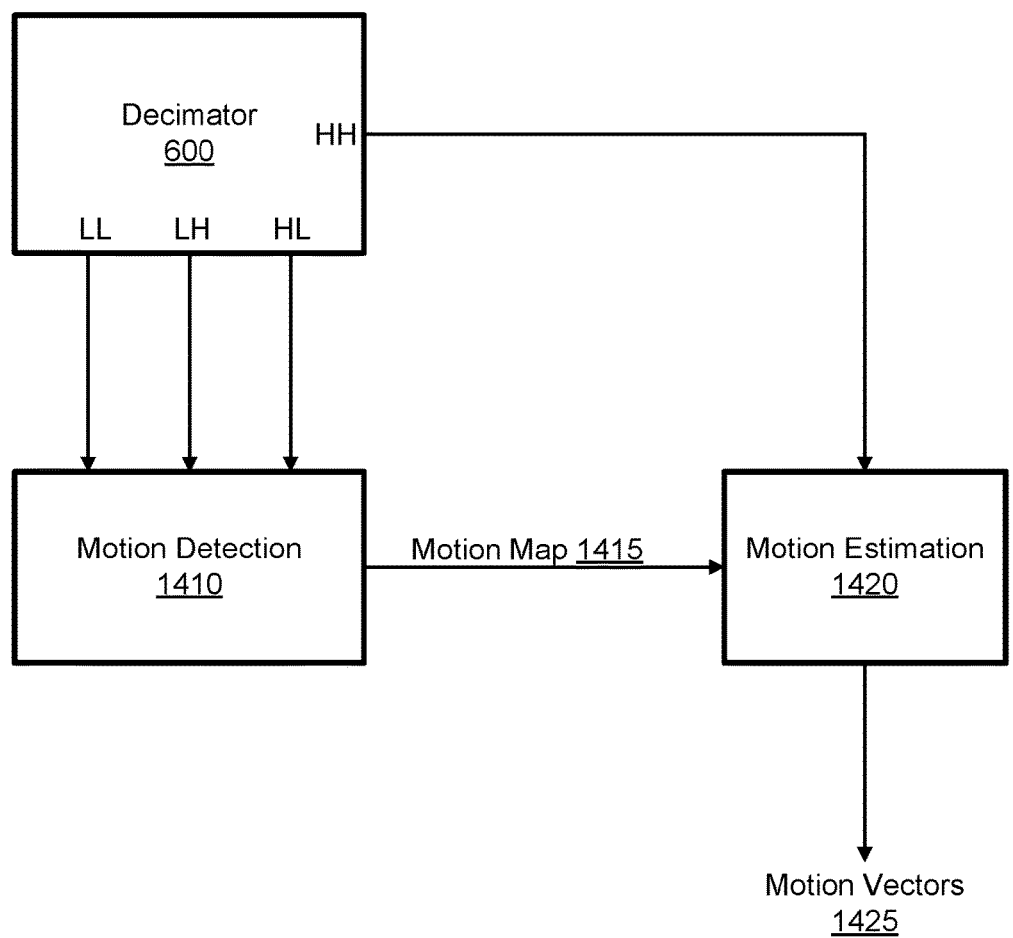
FIG. 14 illustrates an embodiment of a system for motion detection and estimation using decimated image data.

One embodiment of the image capture accelerator 120 performs motion detection and estimation on image data. FIG. 14 illustrates an embodiment of a system for motion detection and estimation using decimated image data. In the embodiment of FIG. 14, the system includes a motion detection circuit 1410 and a motion estimation circuit 1420. In various embodiments, the motion detection 1410 and motion estimation 1420 circuits are components of the ICA 120, the ISP 130, or other components of the camera system.

The decimator 600 of the ICA 120 outputs decimated image data to the motion detection 1410 and motion estimation 1420 circuits. For example, as shown in FIG. 14, the decimator 600 outputs a low-low sub-band component, a low-high sub-band component, and a high-low sub-band component to the motion detection circuit 1410. A high-high sub-band component is output to the motion estimation circuit 1420. However, the decimator 600 may output additional sub-bands to the motion detection 1410 and motion estimation 1420 circuits. For example, the decimator 600 may further decimate the low-low sub-band component and output the resulting decimated components to the motion detection circuit 1410 and/or the motion estimation circuit 1420.

As described above, the low-low sub-band component generated by the decimator 600 represents the decimated image at one-quarter the resolution of the image data input to the decimator 600. Thus, for a frame of image data input to the decimator 600, a first low-low sub-band component is a representation of the frame at one-quarter the resolution of the frame. A second low-low sub-band component, generated by further decimating the first low-low sub-band component, is a representation of the frame at one-sixteenth the resolution of the frame. In contrast, the high-high sub-band components are generated by performing both horizontal and vertical high-pass filtering on the image data. Accordingly, a high-high sub-band component contains edge data of a decimated image.

The motion detection circuit 1410 uses the low-low sub-band components of frames of a video to generate a motion map 1415. A motion map 1415 identifies regions of motion between two video frames. For example, the motion map 1415 is a set of binary values for blocks or pixels of a frame identifying whether the block or pixel moves between the current frame and a subsequent or previous frame. To generate the motion map 1415 between two frames of a video, the motion detection circuit 1410 examines image components of the frames at two or more resolutions. In one embodiment, the motion detection circuit 1410 receives at least two low-low sub-band components for each frame from the decimator 600. For example, the motion detection circuit 1410 receives for each frame a first low-low sub-band component, representing the frame at one-quarter resolution, and a second low-low sub-band component, representing the frame at one-sixteenth resolution. The motion detection circuit 1410 uses the lowest resolution components to identify regions of motion in the frames. For example, the motion detection circuit 1410 identifies pixels or blocks of the lowest resolution image data exhibiting motion between the video frames.

If motion is identified in a region of a frame, the motion detection circuit 1410 uses a higher-resolution component to more precisely identify the regions of motion in the frames. For each region of the lowest resolution image data determined to have motion, the motion detection circuit 1410 identifies pixels or blocks of the higher-resolution frames exhibiting motion. To further refine the motion detection, the motion detection circuit 1410 may examine components of the frames at an even higher resolution. In each iteration, the motion detection circuit 1410 detects motion in blocks or pixels from the regions of the lower-resolution frames determined to have motion. Thus, the motion detection circuit 1410 does not search the entirety of the higher-resolution frame for motion. The motion detection circuit 1410 may select the number of levels of resolution to examine to achieve a desired precision of motion detection for various applications.

Figure 15:
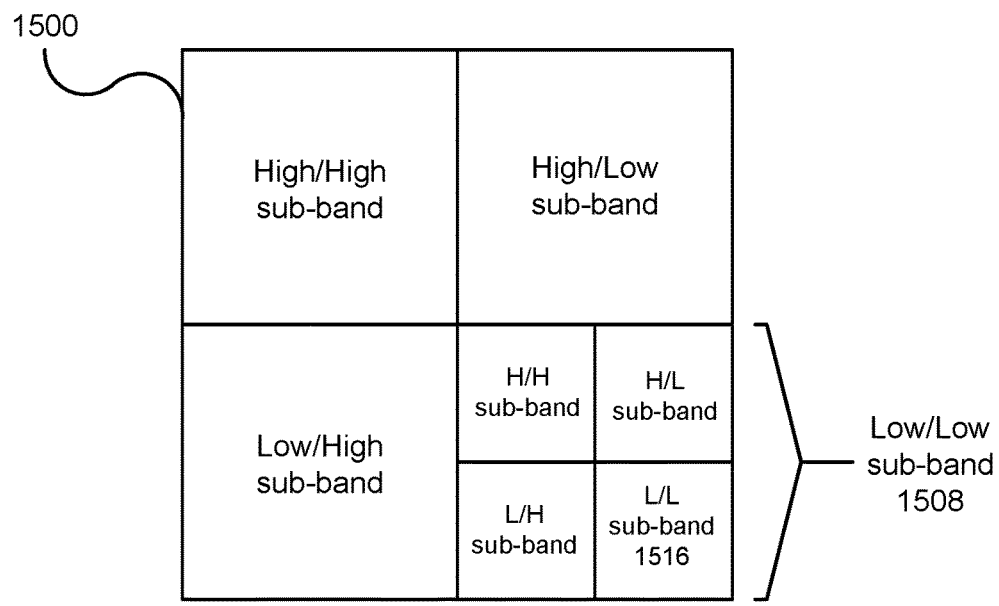
FIG. 15 illustrates an example of decimated image data.

As an example, the motion detection circuit 1410 receives the image data 1500 shown in FIG. 15, which has been decimated twice. The motion detection circuit 1410 uses the low-low sub-band component 1516 to identify regions of motion. For each of the identified regions of motion in the sub-band component 1516, the motion detection circuit 1410 analyzes the low/low sub-band component 1508 (that is, a higher resolution representation of the decimated image) to more precisely identify the regions of motion in the image. The motion detection circuit 1410 may then use the full-resolution image data 1500 to further refine the motion detection. The motion detection circuit 1410 outputs a motion map for the image data 1500, identifying the blocks or pixels of the image data determined to exhibit motion.

For pairs of frames of a video, the motion estimation circuit 1420 receives the motion map 1415 from the motion detection circuit 1410 and the high-high sub-band components of one or both frames in the pair. Using the motion map 1415 and the high-high sub-band components, the motion estimation circuit 1420 generates motion vectors 1425 for inter-frame or intra-frame prediction. By using the high-high sub-band components to generate the motion vectors 1425, the motion estimation circuit 1420 determines the motion vector 1425 based on edge data in the frame rather than the entire frame. Thus, the motion estimation circuit 1420 generates the motion vectors 1425 with less processing time and power than is needed to generate motion vectors based on entire frames of full-resolution image data. Moreover, the motion estimation circuit 1420 predicts the motion vectors 1425 with greater accuracy than would be provided by analyzing the entire frame. Accordingly, less error needs to be encoded for accurate video reconstruction.

The image capture accelerator 120 may use the motion map 1415 and the motion vectors 1425 for a variety of different applications. One embodiment of the image capture accelerator 120 uses the motion detection and estimation performed on decimated image data to generate difference frames for encoding image or video data. For example, one embodiment of the image capture accelerator 120 generates difference frames for inter-frame prediction using the motion vectors 1425.

Figure 16:
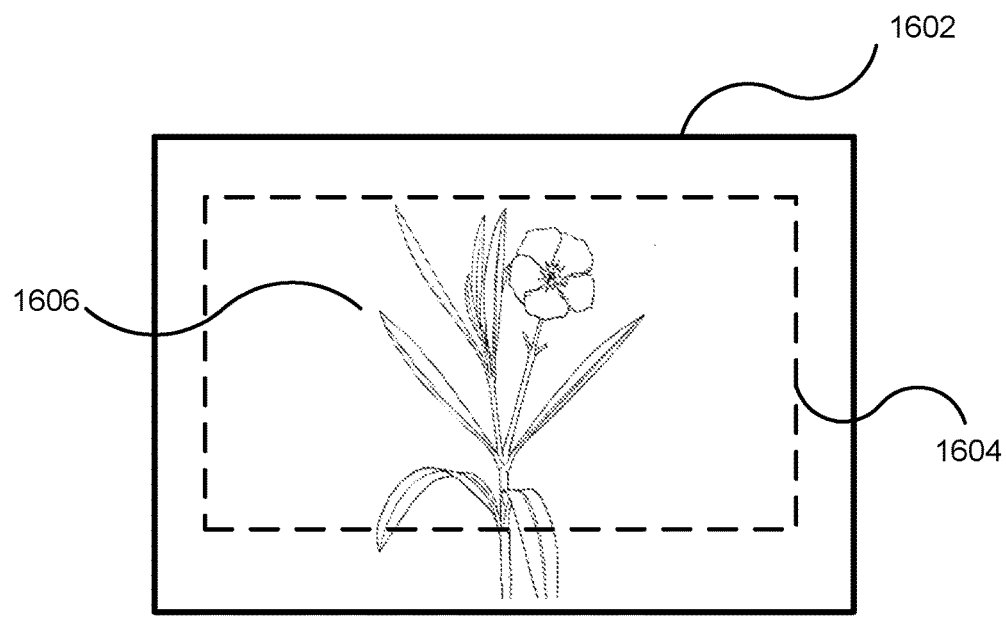
FIG. 16 illustrates an example of electronic image stabilization performed by an image capture accelerator.

In another example application, one embodiment of the image capture accelerator 120 uses the estimated motion to perform electronic image stabilization. FIG. 16 illustrates an example of electronic image stabilization performed by the image capture accelerator 120. As a user of the camera system captures a video, the sensor array 110 captures frames of the image data. The read window 1602 shown in FIG. 16 corresponds to a full window of image data captured by the sensor array 110, while the image data of the keep window 1604 is stored as a frame of the video. If the user moves the camera by small amounts while capturing the video, the relative position of a subject 1606 in the read window 1602 changes. In general, the image capture accelerator 120 performs electronic image stabilization by determining the position of the keep window 1604 relative to the read window 1602 to maintain the same relative position of the subject 1606 in each frame of the video.

Rather than using an input from an external sensor (such as a gyroscope) or performing computation-intensive motion compensation on the full-resolution image data to determine the location of the keep window 1604, the image capture accelerator 120 can use the motion detected by analyzing image data of lower resolutions than the input video. In particular, the image capture accelerator 120 adjusts the position of the keep window 1604 from frame to frame based on the motion vectors 1425. The image capture accelerator 120 uses the motion map 1415 and/or the motion vectors 1425 to identify direction and magnitude of global motion from one read window 1602 to the next. The image capture accelerator 120 then moves the keep window 1604 in the opposite direction of the global motion, effectively canceling the motion in the read window 1602.

In yet another example application of the motion detection and estimation performed on decimated image data, one embodiment of the image capture accelerator 120 uses the detected motion to perform motion compensated temporal filtering (MCTF). MCTF compensates for temporal noise across frames of a video before compressing the video to improve compression efficiency. To perform MCTF, the image capture accelerator 120 uses the motion vectors 1425 to determine which changes across frames of the video are results of motion and which changes are results of temporal noise, and filters the changes that are the result of temporal noise.

Other example applications of the motion detection and estimation include motion tracking and range finding. For example, the image capture accelerator 120 uses low-low sub-band components to track object movement, and calculates the object's movement using high-high sub-band components. In some embodiments, decimated components (such as a low-low sub-band component) can be used to identify or recognize faces or objects within frames (for instance, by performing facial detection or object recognition algorithms on the decimated components), and can calculate the movement of the faces or objects between frames using other decimated components (such as a high-high sub-band component).

Various applications of the image capture accelerator 120 and/or decimated image data rely on rapid retrieval of particular sub-bands from storage. For example, as described above, one embodiment of the image capture accelerator 120 uses selected sub-band components of image data to detect and estimate motion. As another example, one embodiment of the image capture accelerator 120 sends a subset of the frames of a video (e.g., one out of every fourth frame) to the ISP 130 for processing. In yet another example, one embodiment of the image capture accelerator 120 transmits selected sub-band components (e.g., low-low sub-band components) to an external device for video preview. To enable retrieval of any desired sub-band component, one embodiment of the compression engine 124 is configured to store a reference to the location of each sub-band component generated by the decimator 600 in storage. In one embodiment, the compression engine 124 generates a header for each sub-band before storing the sub-band. For example, the header identifies the frame from which the sub-band was generated, the component of the frame (e.g., whether it is the low-low sub-band component, the high-high sub-band component, and so forth), and the length of the stored data packet. When the sub-bands are retrieved from storage, the image capture accelerator 120 identifies the sub-bands using the headers. In another embodiment, the compression engine 124 stores a file pointer identifying the location of each sub-band in storage.

By generating and storing the reference to the location of each sub-band in storage, the compression engine 124 enables retrieval of any sub-band of image data. Accordingly, the compression engine 124 can write the sub-bands to storage as they are generated, rather than storing each sub-band as a unique file or buffering the sub-bands for each frame and storing the image data for the frame in a contiguous block.

Figure 17:
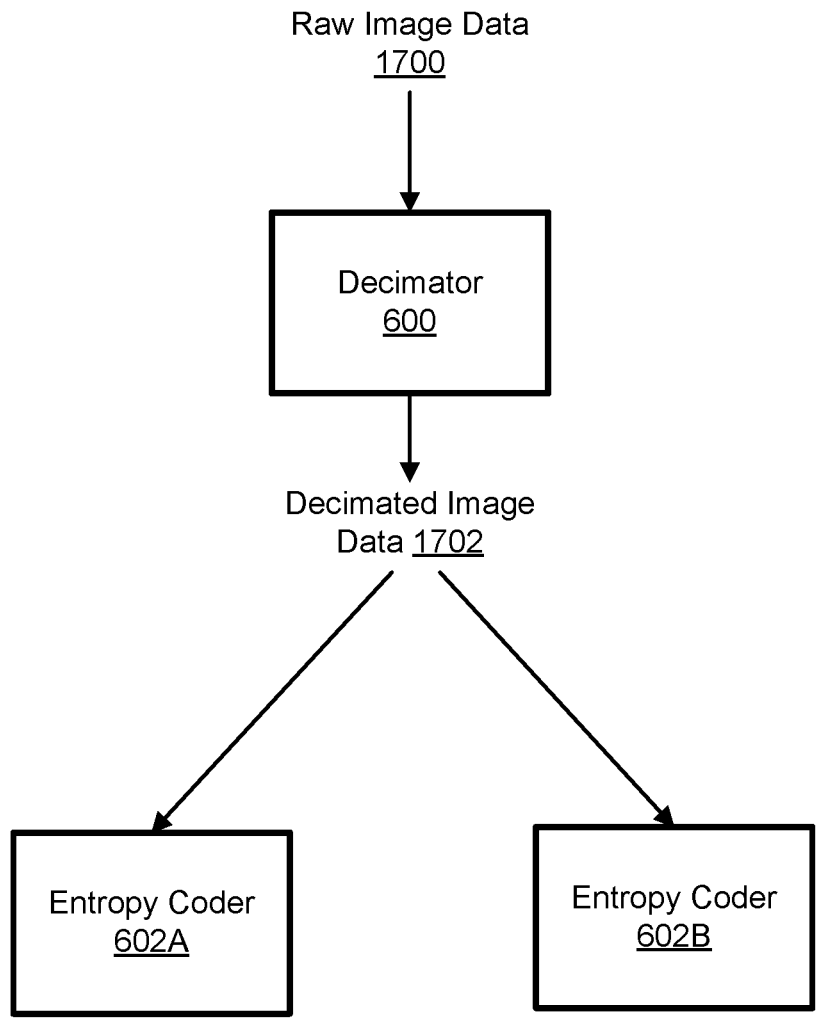
FIG. 17 illustrates an embodiment of an image capture accelerator with two entropy coders.

As described above, the image capture accelerator 120 includes an entropy coder 602 configured to encode decimated image data and generate an encoded video. To improve processing time, one embodiment of the image capture accelerator 120 includes multiple entropy coders 602 operating in parallel to encode an image. FIG. 17 illustrates an embodiment of the ICA 120 with two entropy coders 602A and 602B, each encoding a portion of the decimated image data output by the decimator 600. Other embodiments of the ICA 120 may include additional encoders.

The decimator 600 decimates the raw image data 1700 and outputs decimated image data 1702 to the entropy coders 602A and 602B. The decimator 600 can split the image frame into multiple sub-frames by vertically splitting the frames into two unequal sections, horizontally splitting the frame into two unequal sections, vertically or horizontally splitting the frame into more than two vertical sections, or both vertically and horizontally splitting the frame into a series of rectangles of various widths and heights. The entropy coders 602A and 602B each receive one or more of the image sections for encoding. For example, the entropy coder 602A encodes a left half of each frame of video data, while the entropy coder 602B encodes a right half of each frame. By each encoding a portion of each video frame, the multiple entropy coders 602 operating in parallel in this embodiment of the ICA 120 decrease processing time used to encode the video.

The decimator 600 sends each entropy coder 602 extra pixel values beyond the edge of each sub-frame. For example, the decimator 600 divides an image of resolution 3840×2160 vertically into two sub-frames, each having 1920×2160 pixels, and sends each entropy coder 602 an extra two pixels beyond the boundary between the two sub-frames. That is, each entropy coder 602 receives image data having 1922×2160 pixels. Accordingly, a portion of the decimated image data 1702 is sent to multiple entropy coders 602. The decimator 600 may also pass each entropy coder 602 an identifier of the sub-frame's position relative to the entire frame.

The entropy coders 602 encode the sub-frames received from the decimator 600. In one embodiment, the entropy coders 602 perform VC-5 encoding on respective portions of the decimated image data 1702. In general, the entropy coders 602 apply a border formula and an interior formula to the decimated image data 1702 to generate encoded image data. The border formula is applied to the one pixel-wide border on each of the top, bottom, left, and right sides of the frame, and the interior formula is applied to other pixels of the frame. For example, one embodiment of the entropy coders 602 apply the following wavelet transform formula at the left column of a row or the top row of a column of image data:

$$H_0 = ash(SX_0 - 11X_1 + 4X_2 + 4X_3 - X_4 - X_g + 4, 3) \qquad (1)$$

At the right column of a row or the bottom row of a column of image data, one embodiment of the entropy coders 602 apply the following wavelet transform formula:

$$H_{n/2-1} = ash(SX_{n-1} - 11X_{n-2} + 4X_{n-2} + 4X_{n-4} - X_{n-5} - X_{n-6} + 4, 3) \qquad (2)$$

Finally, the interior wavelet transform formula applied by one embodiment of the entropy coder 602 to image data in the interior of a row or column is as follows:

$$H_i = X_{2i+2} - X_{2i+3} + ash(X_{2i+4} + X_{2i+5} - (X_{2i} + X_{2i+1}) + 4, 3), \qquad (3)$$

$$i = 1, 2, \ldots, \frac{n}{2} - 2$$

If the image data is split into multiple sub-frames and processed in parallel by two or more entropy coders 602, the entropy coders 602 apply the interior formula (equation 3) to boundaries between the sub-frames so that the same wavelet transform values are produced along the boundaries as would have been produced had the image been encoded as a single frame. Each entropy coder 602 uses the extra pixels values beyond the edge of a sub-frame to encode the image data at the boundary using the interior wavelet transform formula. The entropy coders 602 therefore collectively generate the same number of wavelet coefficients for the frame as would have been generated had the image been encoded as a single frame. Moreover, the entropy coders 602 only enable the border formulas (equations 1 and 2) for the boundaries of the sub-frames that correspond to the borders of the entire frame. Thus, if a frame is split both horizontally and vertically three or more times, some entropy coders 602 may not use the border formulas to encode their respective sub-frames.

Figure 18A:
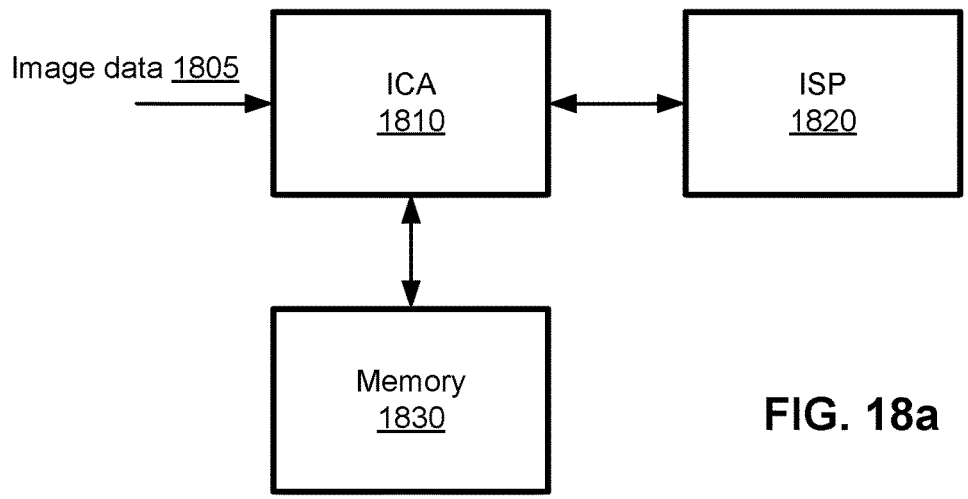
FIG. 18a illustrates a first embodiment of an image capture accelerator memory sharing architecture.

FIG. 18*a* illustrates a first embodiment of an image capture accelerator memory sharing architecture. In the embodiment of FIG. 18*a*, an ICA 1810 receives image data 1805, and either provides the image data 1805 to an ISP 1820, stores the image data 1805 in a memory 1830 communicatively coupled to the ICA 1810, or processes the image data 1805. The processed image data can be subsequently output to the ISP 1820 or stored in the memory 1830.

In the embodiment of FIG. 18*a*, the image data 1805 or processed image data stored at the memory 1830 is accessed by the ISP 1820 via the ICA 1810. In such embodiments, the data bus between the ICA 1810 and the memory 1830 can be of a higher bandwidth than the data bus between the ISP 1820 and the memory 1830. Similarly, the I/O controller of the ICA 1810 can be faster than the I/O controller of the ISP 1820. In such embodiments, the ICA 1810 can receive image data 1805 and can write the received image data 1805 to the memory 1830 at a first data rate, and the ICA 1810 can access image data (either the received image data 1805 or image data processed by the ICA 1810) stored at the memory 1830 and can output the accessed image data to the ISP 1820 at a second data rate slower than the first data rate. Such embodiments allow for a camera system to capture image data at a faster rate than the processing rate of the ISP 1820.

Figure 18B:
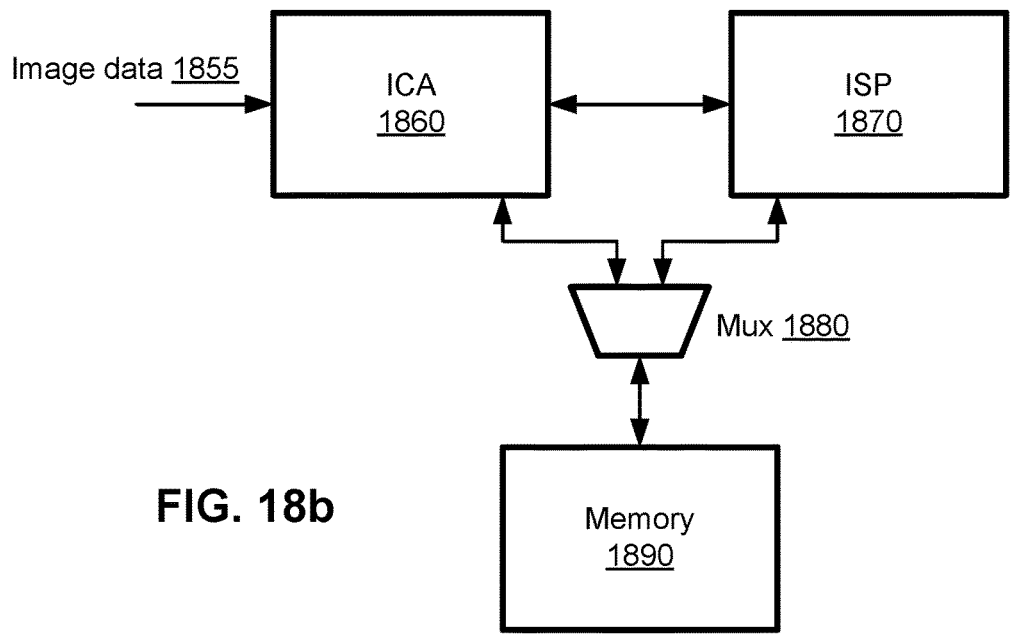
FIG. 18b illustrates a second embodiment of an image capture accelerator memory sharing architecture.

FIG. 18*b* illustrates a second embodiment of an image capture accelerator memory sharing architecture. In the embodiment of FIG. 18*b*, the ICA 1860 can receive image data 1855 and can provide the received image data 1855 to the ISP 1870 or the memory 1890 via a mux 1880. The ISP 1870 can receive image data from the ICA 1860, or can access image data stored at the memory 1890 via the mux 1880. The ICA 1860, the ISP 1870, or an external controller not illustrated in FIG. 18*b* can select the mux input (and accordingly, the ICA 1860 or the ISP 1870) to couple to the mux output. The embodiment of FIG. 18*b* allows the ICA 1860 to receive and write the image data 1855 to the memory 1890 at a first data rate and allows the ISP 1870 to access the image data 1855 from the memory 1890 to a second data rate slower than the first data rate.

Figure 19:
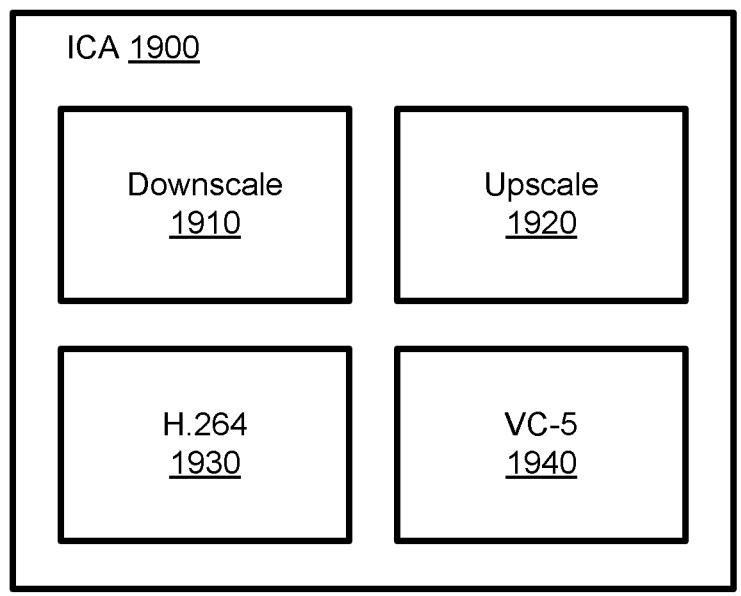
FIG. 19 illustrates an embodiment of an image capture accelerator with on-chip transcoding functionality.

FIG. 19 illustrates an embodiment of an image capture accelerator with on-chip transcoding functionality, such as resolution and frame rate downscaling and resolution upscaling. The ICA 1900 includes a downscale engine 1910, an upscale engine 1920, an H.264 engine 1930, and a VC-5 engine 1940. The downscale engine 1910 can downscale the resolution of decimated video by outputting a low/low sub-band of the decimated video. For example, for a low/low sub-band of decimated video, the downscale engine 1910 can output the low/low sub-band of decimated video instead decoding the decimated video to produce the video at full resolution. The downscale engine 1910 can downscale the frame rate of decimated video by removing frames from the decimated video. For example, the downscale engine 1910 can downscale 4 k resolution 240 fps video into 1080p resolution 120 fps video by outputting the low/low sub-band of every other frame of video.

The upscale engine 1920 can upscale the resolution of decimated video with a low/low sub-band encoded as H.264 video and with high/low, low/high, and high/high sub-bands encoded as VC-5 video. In such embodiments, the low/low sub-band includes 4 color channels, each encoded as H.264 video. To upscale the resolution of such video, the upscale engine 1920 decodes the color channels of the low/low sub-band using the H.264 engine 1930 and combines the decoded color channels into the Bayer color space. The upscale engine 1920 decodes the corresponding high/low, low/high, and high-high VC-5 encoded sub-bands using the VC-5 engine 1940, and combines the decoded low/low sub-band with the decoded high/low, low/high, and high/high sub-bands to create upscaled resolution video. For instance, for a 1080p resolution low/low sub-band, the low/low sub-band and corresponding high/low, low/high, and high/high sub-bands are decoded and combined to create 4 k resolution video.

Additional Configuration Considerations

The embodiments described herein provide systems and methods for accelerating image capture and storage in an image capture system. By accelerating image capture and storage, the image capture systems can capture images or videos at high frame rates and resolutions because the image capture systems are not limited by the capabilities of image signal processors. Moreover, accelerated capturing and storing may reduce power consumption of image capture systems, improving battery life of cameras including the accelerated image capture systems.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each others.

Likewise, as used herein, the terms "comprises," "including," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for an image capture accelerator as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A camera system, comprising:
    an image sensor chip configured to produce image data representative of light incident upon the image sensor chip;
    an image signal processor chip ("ISP") configured to process the image data, the ISP comprising:
        an input configured to receive the image data from the image sensor chip;
        a decimator configured to decimate the received image data into a plurality of image sub-band components;
        a motion detection engine configured to generate a motion map based on a first subset of the plurality of image sub-band components;
        a motion estimation engine configured to generate a set of motion vectors based on the generated motion map and a second subset of the plurality of image sub-band components; and
        an output configured to output one or more of the received image data and the set of motion vectors.

2. The camera system of claim 1, wherein the first subset of image sub-band components comprises a low/low image sub-band component, a low/high image sub-band component, and a high/low image sub-band component.

3. The camera system of claim 1, wherein the second subset of image sub-band components comprises a high/high image sub-band component.

4. The camera system of claim 1, wherein the generated motion map identifies regions of motion between two video frames.

5. The camera system of claim 1, wherein the motion map is generated based on identified regions of movement within a pair of image sub-band components each associated with a different resolution.

6. The camera system of claim 5, wherein each of the pair of image sub-band components comprises a low/low image sub-band component.

7. The camera system of claim 1, wherein the motion vectors are generated based edge data within the second subset of the plurality of image sub-band components.

8. The camera system of claim 1, wherein the ISP further comprises:
    a frame generator configured to generate difference frames representative of a change in image data between two video frames based on the generated motion vectors.

9. The camera system of claim 1, wherein the ISP further comprises:
    a stabilization engine configured to perform electronic image stabilization for subsequently captured image data using the generated motion vectors.

10. The camera system of claim 1, wherein the ISP further comprises:
    a filter engine configured to perform motion compensated temporal filtering using the generated motion vectors.

11. An image signal processor integrated circuit ("ISP"), comprising:
    an input configured to receive image data captured by an image sensor chip;
    a decimator configured to decimate the received image data into a plurality of image sub-band components;
    a motion estimation engine configured to generate a set of motion vectors based on a motion map and a subset of the plurality of image sub-band components; and
    an output configured to selectively output one or more of the received image data and the set of motion vectors to a camera memory.

12. The ISP of claim 11, wherein the motion map is generated based on a second subset of the plurality of image sub-band components.

13. The ISP of claim 11, wherein the subset of image sub-band components comprises a high/high image sub-band component.

14. The ISP of claim 11, wherein the motion map identifies regions of motion between two video frames.

15. The ISP of claim 11, wherein the motion map is generated based on identified regions of movement within a pair of image sub-band components each associated with a different resolution.

16. The ISP of claim 15, wherein each of the pair of image sub-band components comprises a low/low image sub-band component.

17. The ISP of claim 11, wherein the motion vectors are generated based edge data within the subset of the plurality of image sub-band components.

18. The ISP of claim 11, further comprising:
    a frame generator configured to generate difference frames representative of a change in image data between two video frames based on the generated motion vectors.

19. The ISP of claim 11, further comprising:
    a stabilization engine configured to perform electronic image stabilization for subsequently captured image data using the generated motion vectors.

20. The ISP of claim 11, further comprising:
a filter engine configured to perform motion compensated temporal filtering using the generated motion vectors.

* * * * *